US010693737B1

(12) United States Patent
Teflian et al.

(10) Patent No.: US 10,693,737 B1
(45) Date of Patent: Jun. 23, 2020

(54) UNIVERSAL ALIAS AND DEPENDENCY MODELS AND NETWORK ANALYSIS

(71) Applicant: Charter Communications Operating, LLC, St. Louis, MO (US)

(72) Inventors: Mark S. Teflian, Parker, CO (US); David G. Feldman, Lakewood, CO (US); John J. Brophy, Castle Rock, CO (US); Thomas J. Holloran, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 139 days.

(21) Appl. No.: 15/721,250

(22) Filed: Sep. 29, 2017

(51) Int. Cl.
*H04L 12/24* (2006.01)
*H04L 12/26* (2006.01)

(52) U.S. Cl.
CPC ............ *H04L 41/145* (2013.01); *H04L 41/12* (2013.01); *H04L 43/0811* (2013.01)

(58) Field of Classification Search
CPC ..... H04L 41/145; H04L 41/12; H04L 43/0811
See application file for complete search history.

(56) References Cited

U.S. PATENT DOCUMENTS

| | | | | | |
|---|---|---|---|---|---|
| 6,044,402 | A * | 3/2000 | Jacobson | ................ | H04L 41/08 709/224 |
| 6,393,486 | B1 * | 5/2002 | Pelavin | ............... | H04L 41/0813 709/238 |
| 7,684,416 | B2 * | 3/2010 | Galin | ...................... | H04L 41/12 370/252 |
| 7,839,891 | B1 * | 11/2010 | Allan | .................. | H04L 41/0869 370/400 |
| 8,411,591 | B2 * | 4/2013 | Bemont | .................. | H04L 45/00 370/238 |
| 9,565,084 | B2 * | 2/2017 | Bakshi | ................ | H04L 43/0811 |
| 2003/0216143 | A1 * | 11/2003 | Roese | ...................... | G01S 5/02 455/456.1 |

(Continued)

*Primary Examiner* — Alina A Boutah
(74) *Attorney, Agent, or Firm* — Armis IP Law, LLC

(57) ABSTRACT

Computer processor hardware receives data associated with a set of elements in a network. The computer processor hardware assigns a unique identifier value to each respective element in the network. To produce encoded information representative of the network, the computer processor hardware chooses an attribute list indicating different attributes pertinent to the set of elements. For each unique identifier value indicating a corresponding network element, the computer processor hardware utilizes the received data to produce a corresponding set of encoded information indicating settings for the attributes in the list. The computer processor hardware produces a set of encoded information for each of the unique identifier values (and corresponding network elements) into an analytics data set defining the network. The analytics data set indicates all relationships amongst the network elements allowing complete end-to-end network architectures to be evaluated or focus to be placed on specific sub-segments of the network in order to evaluate processes and function at a micro level. It also allows associating costs to delivery service levels, to timing of deployment, or any wide variety of analysis dependent on the combined operation of network components.

29 Claims, 37 Drawing Sheets

(56) References Cited

U.S. PATENT DOCUMENTS

| | | | |
|---|---|---|---|
| 2004/0015728 A1* | 1/2004 | Cole | G02B 5/3083 |
| | | | 726/23 |
| 2004/0220792 A1* | 11/2004 | Gallanis | G06F 11/3447 |
| | | | 703/13 |
| 2008/0310430 A1* | 12/2008 | He | H04L 12/462 |
| | | | 370/400 |
| 2013/0166260 A1* | 6/2013 | Fan | H04L 41/145 |
| | | | 703/2 |
| 2013/0329584 A1* | 12/2013 | Ghose | H04L 45/586 |
| | | | 370/252 |
| 2014/0098710 A1* | 4/2014 | Ong | H04L 41/12 |
| | | | 370/255 |
| 2014/0169187 A1* | 6/2014 | Jenkins | H04L 43/04 |
| | | | 370/252 |
| 2015/0172148 A1* | 6/2015 | Ishida | H04L 43/045 |
| | | | 709/224 |
| 2015/0341241 A1* | 11/2015 | Robertson | H04L 43/0811 |
| | | | 709/224 |
| 2016/0224656 A1* | 8/2016 | Rais-Ghasem | G06F 16/212 |
| 2016/0335484 A1* | 11/2016 | Xie | G06K 9/00335 |
| 2017/0005982 A1* | 1/2017 | Gould | G06F 19/3481 |
| 2017/0195331 A1* | 7/2017 | Wu | G05B 19/41885 |
| 2017/0213167 A1* | 7/2017 | Rinke | G06Q 10/0633 |
| 2017/0223046 A1* | 8/2017 | Singh | H04L 43/062 |
| 2018/0026910 A1* | 1/2018 | Balle | G06F 3/0613 |
| | | | 709/226 |
| 2018/0152836 A1* | 5/2018 | Milton | G01S 5/00 |
| 2018/0329799 A1* | 11/2018 | Pestana | H04L 41/08 |
| 2018/0337931 A1* | 11/2018 | Hermoni | H04L 63/123 |
| 2019/0102440 A1* | 4/2019 | Tabak | G06F 16/951 |
| 2019/0123972 A1* | 4/2019 | Parandehgheibi | H04L 41/145 |

\* cited by examiner

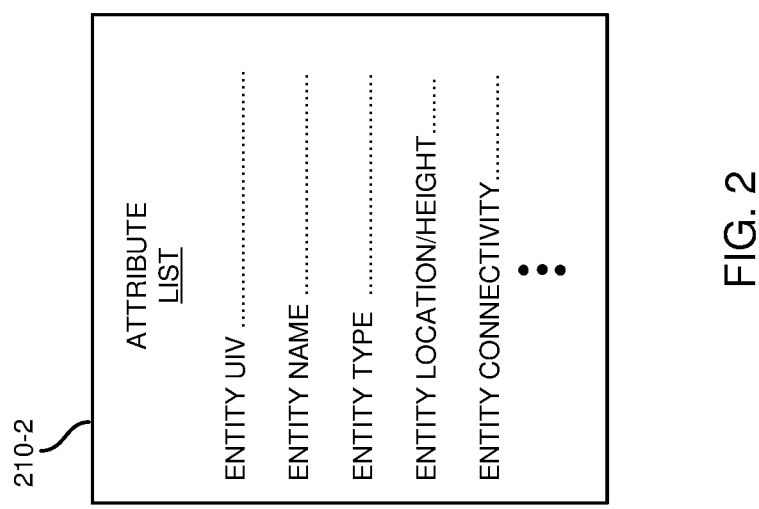

ATTRIBUTE LIST 210-2

| Genome ADS Columns | |
|---|---|
| Column Name | Column Description |
| N_UUID_NM | Network Genome UUID (Universally Unique Identifier) |
| N_UUID_TYPE_NM | Network or Device Type (CM, CMTS, Node, PDC, etc.) |
| N_DWNSTRM_YN_FLAG | Downstream Network UUID's (Yes/No) |
| N_UPSTRM_UUID_NM | Upstream Network Genome UUID |
| N_LOC_CODE | Zip Code, SysLoc, or other general location code for the UUID |
| N_V1_LAT | Vertex 1 Latitude of the UUID |
| N_V1_LON | Vertex 1 Longitude of the UUID |
| N_V1_ALT | Vertex 1 Altitude fo the UUID |
| N_V2_LAT | Vertex 2 Latitude of the UUID area |
| N_V2_LON | Vertex 2 Longitude of the UUID area |
| N_V2_ALT | Vertex 2 Altitude of the UUID |
| N_V3_LAT | Vertex 3 Latitude of the UUID area |
| N_V3_LON | Vertex 3 Longitude of the UUID area |
| N_V3_ALT | Vertex 3 Altitude of the UUID |
| N_V4_LAT | Vertex 4 Latitude of the UUID area |
| N_V4_LON | Vertex 4 Longitude of the UUID area |
| N_V4_ALT | Vertex 4 Altitude of the UUID |
| N_V5_LAT | Vertex 5 Latitude of the UUID area |
| N_V5_LON | Vertex 5 Longitude of the UUID area |
| N_V5_ALT | Vertex 5 Altitude of the UUID |
| ... | |

FIG. 3

| N_UUID_NM<br>Network Genome UUID (Universally Unique) | N_UUID_TYPE<br>Network or Device Type (CM, CMTS, Node, PDC, etc.) | N_DWNSTR<br>Downstream Network UUID's (Yes/No) | N_UPSTRM<br>Upstream Network Genome UUID | N_LOC_CODE<br>Zip Code, SysLoc, or other general location code for the UUID | N_V1_LAT<br>Vertex 1 Latitude of the UUID | N_V1_LON<br>Vertex 1 Longitude of the UUID | N_V1_ALT<br>Vertex 1 Altitude of the UUID |
|---|---|---|---|---|---|---|---|
| P1XXXX | PDC | Y | HE001 | 63131 | 38.726098 | -90.407903 | 624 |
| P2XXXX | PDC | Y | HE001 | 63131 | 38.726098 | -90.407903 | 622 |
| P3XXXX | PDC | Y | HE001 | 63131 | 38.726098 | -90.407903 | 501 |
| P4XXXX | PDC | Y | HE001 | 63131 | 38.726098 | -90.407903 | 586 |
| P5XXXX | PDC | Y | HE001 | 63131 | 38.72241 | -90.414524 | 619 |

ADS 160-1

FIG. 4

ADS 810-1

| A | B | C | D | E | F | G | H | I | J | K |
|---|---|---|---|---|---|---|---|---|---|---|
| Network Genome UUID (Universally Unique Identifier) | Network or Device Type (CM, CMTS, Node, PDC, etc.) | Downstream Network UUID's (Yes/No) | Upstream Network Genome UUID | Zip Code, SysLoc, or other general location code for the UUID | Vertex 1 Latitude of the UUID | Vertex 1 Longitude of the UUID | Vertex 1 Altitude of the UUID | Vertex 2 Latitude of the UUID area | Vertex 2 Longitude of the UUID area | Vertex 2 Altitude of the UUID |
| N_UUID_NM | N_UUID_TYPE_NM | N_DWNSTRM_YN_FLAG | M_UUID_NM | N_LOC_CODE | N_V1_LAT | N_V1_LON | N_V1_ALT | N_V2_LAT | N_V2_LON | N_V2_ALT |
| P1S1FF | FEEDF | Y | P1XXXX | 63131 | 38.7331 | -90.4046 | 624 | 38.733095 | -90.404642 | 624 |
| P1S2FF | FEEDF | Y | P1XXXX | 63131 | 38.7331 | -90.4046 | 624 | 38.727131 | -90.414589 | 584 |
| P1S3FF | FEEDF | Y | P1XXXX | 63131 | 38.7331 | -90.4046 | 624 | 38.734038 | -90.408086 | 624 |
| P2S1FF | FEEDF | Y | P2XXXX | 63131 | 38.73843 | -90.4169 | 622 | 38.73626 | -90.412866 | 623 |
| P2S2FF | FEEDF | Y | P2XXXX | 63131 | 38.73843 | -90.4169 | 622 | 38.736656 | -90.418858 | 556 |
| P2S3FF | FEEDF | Y | P2XXXX | 63131 | 38.73843 | -90.4169 | 622 | 38.738531 | -90.427757 | 602 |
| P2S4FF | FEEDF | Y | P2XXXX | 63131 | 38.73843 | -90.4169 | 622 | 38.741794 | -90.435428 | 609 |
| P3S1FF | FEEDF | Y | P3XXXX | 63131 | 38.75549 | -90.4205 | 501 | 38.755493 | -90.420495 | 501 |
| P3S2FF | FEEDF | Y | P3XXXX | 63131 | 38.75549 | -90.4205 | 501 | 38.755635 | -90.418838 | 516 |
| P3S3FF | FEEDF | Y | P3XXXX | 63131 | 38.75549 | -90.4205 | 501 | 38.751156 | -90.426858 | 492 |
| P3S4FF | FEEDF | Y | P3XXXX | 63131 | 38.75549 | -90.4205 | 501 | 38.759998 | -90.434915 | 503 |
| P4S1FF | FEEDF | Y | P4XXXX | 63131 | 38.75536 | -90.4088 | 586 | 38.755363 | -90.408828 | 586 |
| P4S2FF | FEEDF | Y | P4XXXX | 63131 | 38.75536 | -90.4088 | 586 | 38.753384 | -90.403371 | 595 |
| P5S1FF | FEEDF | Y | P5XXXX | 63131 | 38.74061 | -90.4034 | 619 | 38.740609 | -90.403447 | 619 |
| P5S2FF | FEEDF | Y | P5XXXX | 63131 | 38.74061 | -90.4034 | 619 | 38.737723 | -90.395556 | 580 |

| L | M | N | O | P | Q | R | S |
|---|---|---|---|---|---|---|---|
| Total Coax Distance (miles) | Total Fiber Distance (miles) | Total Construction Distance (miles) | Aerial O/L % | Aerial New % | Aerial Remake % | Joint Trench % | Plow/Trench % |
| N_COAX_DIST_MI | DIST_MI | R_DIST_MI | L_OL_PCT | N_AERIAL_NEW_PCT | N_AERIAL_REM_PCT | N_UG_JTRENCH_PCT | N_UG_PTRENCH_PCT |
| 0 | 0 | 0 | 78.0% | 0.0% | 0.0% | 0.0% | 22.0% |
| 0 | 0.6911 | 0.18333 | 78.0% | 0.0% | 0.0% | 0.0% | 22.0% |
| 0 | 0.21951 | 0.06534 | 78.0% | 0.0% | 0.0% | 0.0% | 22.0% |
| 0 | 0.25777 | 0.25777 | 78.0% | 0.0% | 0.0% | 0.0% | 22.0% |
| 0 | 0.23182 | 0.23182 | 78.0% | 0.0% | 0.0% | 0.0% | 22.0% |
| 0 | 0.74242 | 0 | 78.0% | 0.0% | 0.0% | 0.0% | 22.0% |
| 0 | 1.10265 | 0.36023 | 78.0% | 0.0% | 0.0% | 0.0% | 22.0% |
| 0 | 0.29318 | 0.18788 | 78.0% | 0.0% | 0.0% | 0.0% | 22.0% |
| 0 | 0.5928 | 0 | 78.0% | 0.0% | 0.0% | 0.0% | 22.0% |
| 0 | 1.45208 | 0.85928 | 78.0% | 0.0% | 0.0% | 0.0% | 22.0% |
| 0 | 0 | 0 | 78.0% | 0.0% | 0.0% | 0.0% | 22.0% |
| 0 | 0.31932 | 0.25303 | 78.0% | 0.0% | 0.0% | 0.0% | 22.0% |
| 0 | 0 | 0 | 78.0% | 0.0% | 0.0% | 0.0% | 22.0% |
| 0 | 0.67917 | 0.67917 | 78.0% | 0.0% | 0.0% | 0.0% | 22.0% |

ADS 810-2

| T | U | V |
|---|---|---|
| Direct Bore % | Vacant Duct % | Core Extraction Duct % |
| N_UG_DBORE_PCT | N_UG_VDUCT_PCT | N_UG_CED_PCT |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |
| 0.0% | 0.0% | 0.0% |

ADS 810-3

FIG. 10

| A | B | C | D | E | F | G | H |
|---|---|---|---|---|---|---|---|
| Network Genome UUID (Universally Unique Identifier) N_UUID_NM | Network or Device Type (CM, CMTS, Node, PDC, etc.) N_UUID_TYPE_NM | Downstream Network UUID's (Yes/No) N_DWNSTRM_YN_FLAG | Upstream Network Genome UUID N_UPSTRM_UUID_NM | Zip Code, SysLoc, or other general location code for the UUID N_LOC_CODE | Vertex 1 Latitude of the UUID N_V1_LAT | Vertex 1 Longitude of the UUID N_V1_LON | Vertex 1 Altitude of the UUID N_V1_ALT |
| P1S1XX | SDC | Y |        | 63131 | 38.733 | -90.4046 | 624 |
| P1S2XX | SDC | Y | P1S1FF | 63131 | 38.727 | -90.4146 | 584 |
| P1S3XX | SDC | Y | P1S2FF | 63131 | 38.734 | -90.4081 | 624 |
| P2S1XX | SDC | Y | P1S3FF | 63131 | 38.736 | -90.4129 | 623 |
| P2S2XX | SDC | Y | P2S1FF | 63131 | 38.737 | -90.4189 | 556 |
| P2S3XX | SDC | Y | P2S2FF | 63131 | 38.739 | -90.4278 | 602 |
| P2S4XX | SDC | Y | P2S3FF | 63131 | 38.742 | -90.4354 | 609 |
| P3S1XX | SDC | Y | P2S4FF | 63131 | 38.755 | -90.4205 | 501 |
| P3S2XX | SDC | Y | P3S1FF | 63131 | 38.756 | -90.4188 | 516 |
| P3S3XX | SDC | Y | P3S2FF | 63131 | 38.751 | -90.4269 | 492 |
| P3S4XX | SDC | Y | P3S3FF | 63131 | 38.76  | -90.4349 | 503 |
| P4S1XX | SDC | Y | P3S4FF | 63131 | 38.755 | -90.4088 | 586 |
| P4S2XX | SDC | Y | P4S1FF | 63131 | 38.753 | -90.4034 | 595 |
| P5S1XX | SDC | Y | P4S2FF | 63131 | 38.741 | -90.4034 | 619 |
| P5S2XX | SDC | Y | P5S1FF | 63131 | 38.738 | -90.3956 | 580 |

ADS 1260

FIG. 12

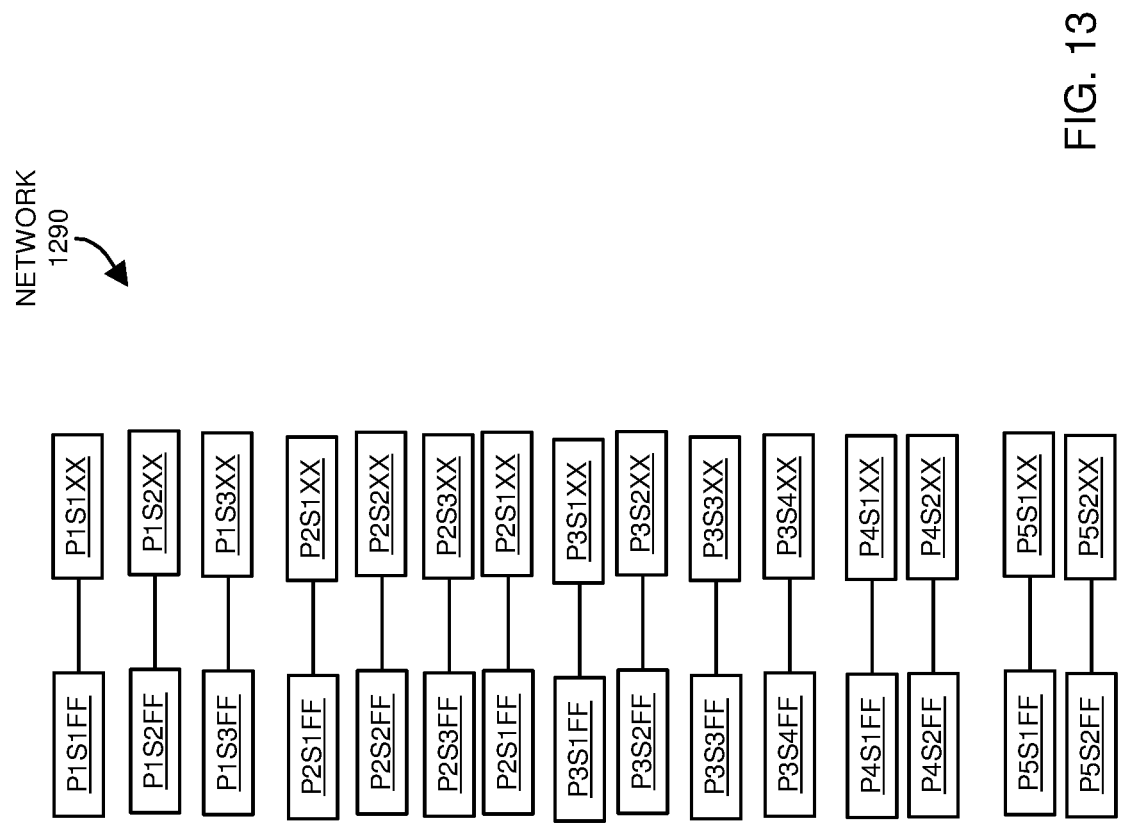

FIG. 14

ADS 1460-1

| A | B | C | D | E | F | G | H |
|---|---|---|---|---|---|---|---|
| Network Genome UUID (Universally Unique Identifier) | Network or Device Type (CM, CMTS, Node, ...) | Downstream Network UUID's (Yes/No) | Upstream Network Genome UUID | Zip Code, SysLoc, or other general location | Vertex 1 Latitude of the UUID | Vertex 1 Longitude of the UUID | Vertex 1 Altitude of the UUID |
| N_UUID_NM | N_UUID_TYPE_NM | N_DWNSTRM_YN_FLAG | N_UPSTRM_UUID_NM | N_LOC_CODE | N_V1_LAT | N_V1_LON | N_V1_ALT |
| P1S1D1 | DSTF | N | P1S1XX | 63131 | 38.726698 | -90.407903 | 609 |
| P1S1D2 | DSTF | N | P1S1XX | 63131 | 38.727542 | -90.412474 | 604 |
| P1S1D3 | DSTF | N | P1S1XX | 63131 | 38.733509 | -90.406664 | 634 |
| P1S2D1 | DSTF | N | P1S2XX | 63131 | 38.722241 | -90.414524 | 536 |
| P1S2D2 | DSTF | N | P1S2XX | 63131 | 38.723247 | -90.414267 | 552 |
| P1S3D1 | DSTF | N | P1S3XX | 63131 | 38.728627 | -90.418761 | 515 |
| P1S3D2 | DSTF | N | P1S3XX | 63131 | 38.736017 | -90.40998 | 623 |
| P2S1D1 | DSTF | N | P2S1XX | 63131 | 38.733083 | -90.413917 | 552 |
| P2S1D2 | DSTF | N | P2S1XX | 63131 | 38.73673 | -90.425042 | 590 |
| P2S2D1 | DSTF | N | P2S2XX | 63131 | 38.729503 | -90.427478 | 509 |
| P2S2D2 | DSTF | N | P2S2XX | 63131 | 38.734349 | -90.422553 | 523 |
| P2S3D1 | DSTF | N | P2S3XX | 63131 | 38.740282 | -90.425825 | 573 |
| P2S3D2 | DSTF | N | P2S3XX | 63131 | 38.740625 | -90.42471 | 597 |
| P2S4D1 | DSTF | N | P2S4XX | 63131 | 38.72915 | -90.433057 | 606 |
| P2S4D2 | DSTF | N | P2S4XX | 63131 | 38.729259 | -90.427692 | 503 |
| P3S1D1 | DSTF | N | P3S1XX | 63131 | 38.756338 | -90.4171 | |
| P3S1D2 | DSTF | N | P3S1XX | 63131 | 38.755447 | -90.424363 | |
| P3S1D3 | DSTF | N | P3S1XX | 63131 | 38.755727 | -90.4177 | |
| P3S1D4 | DSTF | N | P3S1XX | 63131 | 38.754104 | -90.422421 | |
| P3S2D1 | DSTF | N | P3S2XX | 63131 | 38.753828 | -90.420758 | |
| P3S2D2 | DSTF | N | P3S2XX | 63131 | 38.754313 | -90.416542 | |
| P3S2D3 | DSTF | N | P3S2XX | 63131 | 38.753803 | -90.420812 | |
| P3S3D1 | DSTF | N | P3S3XX | 63131 | 38.751156 | -90.426858 | |
| P3S3D2 | DSTF | N | P3S3XX | 63131 | 38.746807 | -90.420861 | |
| P3S3D3 | DSTF | N | P3S3XX | 63131 | 38.747247 | -90.433853 | |
| P3S4D1 | DSTF | N | P3S4XX | 63131 | 38.753557 | -90.451012 | |

| | I | J | K | L | M | N | O | P | Q | R |
|---|---|---|---|---|---|---|---|---|---|---|
| | Vertex 2 Latitude of the UUID area | Vertex 2 Longitude of the UUID area | Vertex 2 Altitude of the UUID | Vertex 3 Latitude of the UUID area | Vertex 3 Longitude of the UUID area | Vertex 3 Altitude of the UUID | Vertex 4 Latitude of the UUID area | Vertex 4 Longitude of the UUID area | Vertex 4 Altitude of the UUID | Distribution Leg Aerial % |
| | N_V2_LAT | N_V2_LON | N_V2_ALT | N_V3_LAT | N_V3_LON | N_V3_ALT | N_V4_LAT | N_V4_LON | N_V4_ALT | N_DISTR_LEG_AERIAL_PCT |
| | 38.725462 | -90.404813 | 622 | 38.7333 | -90.40211 | 599 | 38.73433 | -90.404813 | 630 | 78.00% |
| | 38.722996 | -90.408359 | 556 | 38.7311 | -90.405629 | 630 | 38.73406 | -90.407952 | 626 | 78.00% |
| | 38.725333 | -90.404454 | 605 | 38.7377 | -90.401257 | 599 | 38.74041 | -90.405223 | 615 | 78.00% |
| | 38.722042 | -90.407937 | 566 | 38.7242 | -90.407551 | 586 | 38.72752 | -90.41107 | 592 | 78.00% |
| | 38.72236 | -90.412593 | 525 | 38.7272 | -90.413097 | 603 | 38.72757 | -90.419245 | 517 | 78.00% |
| | 38.726192 | -90.413955 | 587 | 38.7344 | -90.408869 | 620 | 38.73332 | -90.417189 | 584 | 78.00% |
| | 38.734544 | -90.407866 | 628 | 38.7406 | -90.404926 | 623 | 38.74038 | -90.409368 | 569 | 78.00% |
| | 38.734251 | -90.409883 | 615 | 38.7414 | -90.411557 | 545 | 38.74147 | -90.414582 | 544 | 78.00% |
| | 38.733114 | -90.415515 | 558 | 38.7414 | -90.415741 | 535 | 38.74037 | -90.420923 | 601 | 78.00% |
| | 38.72962 | -90.418423 | 530 | 38.738 | -90.416749 | 617 | 38.73601 | -90.422703 | 532 | 78.00% |
| | 38.733345 | -90.420289 | 590 | 38.7367 | -90.418766 | 555 | 38.736 | -90.422982 | 535 | 78.00% |
| | 38.740433 | -90.424227 | 604 | 38.7419 | -90.422821 | 571 | 38.74152 | -90.427285 | 544 | 78.00% |
| | 38.739613 | -90.418208 | 618 | 38.7427 | -90.417672 | 522 | 38.74371 | -90.431319 | 523 | 78.00% |
| | 38.739208 | -90.428401 | 608 | 38.7413 | -90.429356 | 574 | 38.74123 | -90.433841 | 603 | 78.00% |
| | 38.733694 | -90.425031 | 517 | 38.738 | -90.426295 | 595 | 38.73822 | -90.428602 | 599 | 78.00% |
| | 38.755501 | -90.415066 | | 38.7567 | -90.414959 | | 38.75682 | -90.417034 | | 78.00% |
| | 38.756037 | -90.419814 | | 38.7583 | -90.421037 | | 38.75799 | -90.422475 | | 78.00% |
| | 38.755485 | -90.414771 | | 38.7562 | -90.414879 | | 38.75562 | -90.417218 | | 78.00% |
| | 38.753569 | -90.42093 | | 38.7556 | -90.41931 | | 38.75589 | -90.421831 | | 78.00% |
| | 38.752757 | -90.417261 | | 38.7537 | -90.416027 | | 38.75555 | -90.418555 | | 78.00% |
| | 38.753811 | -90.415447 | | 38.7552 | -90.414664 | | 38.75533 | -90.416703 | | 78.00% |
| | 38.752422 | -90.417379 | | 38.7552 | -90.414256 | | 38.75413 | -90.420576 | | 78.00% |
| | 38.746646 | -90.420764 | | 38.7505 | -90.416741 | | 38.75389 | -90.421901 | | 78.00% |
| | 38.74428 | -90.414632 | | 38.7475 | -90.412561 | | 38.75231 | -90.417803 | | 78.00% |
| | 38.745908 | -90.42793 | | 38.7491 | -90.424401 | | 38.7514 | -90.429937 | | 78.00% |
| | 38.751003 | -90.419958 | | 38.7582 | -90.434627 | | 38.76092 | -90.440914 | | 78.00% |

ADS 1460-3

| S | T | U | V | W | X | Y | Z |
|---|---|---|---|---|---|---|---|
| Total Distribution Leg Distance (miles) N_DISTR_LEG_DIST_MI | Total MDU plenum rated Conduit Distance N_MDU_PLE_NUM_COND_DIST_MI | Total Coax Distance (miles) N_COAX_DIST_MI | Total Fiber Distance (miles) N_FIBER_DIST_MI | Total Construction Distance (miles) N_CONSTR_DIST_MI | Aerial O/L % N_AERIAL_OL_PCT | Aerial New % N_AERIAL_NEW_P | Aerial Remake % N_AERIAL_REM_PCT |
| 1.24811 | 0 | 0 | 1.24811 | 1.24811 | 78.00% | 0.00% | 0.00% |
| 1.77519 | 0 | 0 | 1.77519 | 1.26742 | 78.00% | 0.00% | 0.00% |
| 1.42159 | 0 | 0 | 1.42159 | 1.26742 | 78.00% | 0.00% | 0.00% |
| 1.27822 | 0 | 0 | 1.27922 | 1.13807 | 78.00% | 0.00% | 0.00% |
| 1.15947 | 0 | 0 | 1.15947 | 1.01932 | 78.00% | 0.00% | 0.00% |
| 2.17178 | 0 | 0 | 2.17178 | 2.12443 | 78.00% | 0.00% | 0.00% |
| 1.56742 | 0 | 0 | 1.56742 | 1.52089 | 78.00% | 0.00% | 0.00% |
| 1.40985 | 0 | 0 | 1.40985 | 1.40985 | 78.00% | 0.00% | 0.00% |
| 2.94261 | 0 | 0 | 2.94261 | 2.68485 | 78.00% | 0.00% | 0.00% |
| 3.16837 | 0 | 0 | 3.16837 | 3.16837 | 78.00% | 0.00% | 0.00% |
| 0.92424 | 0 | 0 | 0.92424 | 0.92424 | 78.00% | 0.00% | 0.00% |
| 0.88314 | 0 | 0 | 0.88314 | 0.63163 | 78.00% | 0.00% | 0.00% |
| 3.33504 | 0 | 0 | 3.33504 | 3.08352 | 78.00% | 0.00% | 0.00% |
| 2.42727 | 0 | 0 | 2.42727 | 2.42727 | 78.00% | 0.00% | 0.00% |
| 2.39129 | 0 | 0 | 2.39129 | 2.39129 | 78.00% | 0.00% | 0.00% |
| 0.49375 | 0 | 0 | 0.49375 | 0.49375 | 78.00% | 0.00% | 0.00% |
| 0.63655 | 0 | 0 | 0.63655 | 0.63655 | 78.00% | 0.00% | 0.00% |
| 0.38977 | 0 | 0 | 0.38977 | 0.28447 | 78.00% | 0.00% | 0.00% |
| 0.37273 | 0 | 0 | 0.37273 | 0.37273 | 78.00% | 0.00% | 0.00% |
| 0.69848 | 0 | 0 | 0.69848 | 0.51231 | 78.00% | 0.00% | 0.00% |
| 0.16269 | 0 | 0 | 0.16269 | 0.09962 | 78.00% | 0.00% | 0.00% |
| 0.69867 | 0 | 0 | 0.69867 | 0.69867 | 78.00% | 0.00% | 0.00% |
| 1.34233 | 0 | 0 | 1.34223 | 1.16212 | 78.00% | 0.00% | 0.00% |
| 3.15436 | 0 | 0 | 3.15436 | 2.97424 | 78.00% | 0.00% | 0.00% |
| 1.5322 | 0 | 0 | 1.5322 | 1.5322 | 78.00% | 0.00% | 0.00% |
| 3.49981 | 0 | 0 | 3.49981 | 3.49981 | 78.00% | 0.00% | 0.00% |

| AA | AB | AC | AD | AE | AF | AG | AH | AI |
|---|---|---|---|---|---|---|---|---|
| Joint Trench % | Plow/Trench % | Direct Bore % | Vacant Duct % | Core Extraction Duct % | #Passings MDU High Rise | #Passings MDU Campus | #Passings Residential | #Passings Enterprise |
| N_UG_JTRE NCH_PCT | N_UG_PTRE NCH_PCT | N_UG_DB ORE_PCT | N_UG_VD UCT_PCT | N_CED_PCT | N_PASSIN GS_MDU | N_PASSINGS_ MDU_CS_CNT | N_PASSING S_RESI_CNT | N_PASSING S_ENT_CNT |
| 0.00% | 22.00% | 0.00% | 0.00% | 0.00% | 0 | 0 | 53 | 0 |
| 0.00% | 22.00% | 0.00% | 0.00% | 0.00% | 0 | 0 | 163 | 0 |
| 0.00% | 22.00% | 0.00% | 0.00% | 0.00% | 0 | 0 | 130 | 0 |
| 0.00% | 22.00% | 0.00% | 0.00% | 0.00% | 0 | 0 | 216 | 0 |
| 0.00% | 22.00% | 0.00% | 0.00% | 0.00% | 0 | 0 | 175 | 0 |
| 0.00% | 22.00% | 0.00% | 0.00% | 0.00% | 0 | 0 | 241 | 0 |
| 0.00% | 22.00% | 0.00% | 0.00% | 0.00% | 0 | 0 | 173 | 0 |
| 0.00% | 22.00% | 0.00% | 0.00% | 0.00% | 0 | 0 | 127 | 0 |
| 0.00% | 22.00% | 0.00% | 0.00% | 0.00% | 0 | 0 | 275 | 0 |
| 0.00% | 22.00% | 0.00% | 0.00% | 0.00% | 0 | 0 | 317 | 0 |
| 0.00% | 22.00% | 0.00% | 0.00% | 0.00% | 0 | 0 | 93 | 0 |
| 0.00% | 22.00% | 0.00% | 0.00% | 0.00% | 0 | 0 | 72 | 0 |
| 0.00% | 22.00% | 0.00% | 0.00% | 0.00% | 0 | 0 | 270 | 0 |
| 0.00% | 22.00% | 0.00% | 0.00% | 0.00% | 0 | 0 | 185 | 0 |
| 0.00% | 22.00% | 0.00% | 0.00% | 0.00% | 0 | 0 | 158 | 0 |
| 0.00% | 22.00% | 0.00% | 0.00% | 0.00% | 0 | 0 | 101 | 0 |
| 0.00% | 22.00% | 0.00% | 0.00% | 0.00% | 0 | 0 | 116 | 0 |
| 0.00% | 22.00% | 0.00% | 0.00% | 0.00% | 0 | 0 | 72 | 0 |
| 0.00% | 22.00% | 0.00% | 0.00% | 0.00% | 0 | 0 | 63 | 0 |
| 0.00% | 22.00% | 0.00% | 0.00% | 0.00% | 0 | 0 | 193 | 0 |
| 0.00% | 22.00% | 0.00% | 0.00% | 0.00% | 0 | 0 | 44 | 0 |
| 0.00% | 22.00% | 0.00% | 0.00% | 0.00% | 0 | 0 | 191 | 0 |
| 0.00% | 22.00% | 0.00% | 0.00% | 0.00% | 0 | 0 | 26 | 0 |
| 0.00% | 22.00% | 0.00% | 0.00% | 0.00% | 0 | 0 | 131 | 0 |
| 0.00% | 22.00% | 0.00% | 0.00% | 0.00% | 0 | 0 | 0 | 0 |
| 0.00% | 22.00% | 0.00% | 0.00% | 0.00% | 0 | 0 | 0 | 0 |

ADS 1460-4

FIG. 17

| AJ | AK | AL | AM | AN | AO | AP | AQ | AR | AS |
|---|---|---|---|---|---|---|---|---|---|
| #Passings SMB | Conversion % (#Resi subscribers /#Resi passings) | Conversion (#Enterprise subscriber revenue/$Enterprise) | Conversion % (#SMB subscribers/ #SMB passings) | Conversion % (#MDU subscribers/# MDU passings) | Telespend $ MRR ($Resi spend/mo * #Resi passings) | Telespend $ MRR ($Enterprise spend/mo * #Enterprise) | Telespend $ MRR ($SMB spend/mo * #SMB passings) | Telespend Revenue Months | Telespend based Operating Costs % |
| N_PASSINGS_SMB_CNT | N_CONV_RESI_PCT | N_CONV_ENT_PCT | N_CONV_SMB_PCT | N_CONV_MDU_PCT | N_TSPEND_RESI_MRR | N_TSPEND_ENT_MRR | N_TSPEND_SMB_MRR | N_TSPEND_REV_MOS_CNT | N_TSPEND_OP_COST_PCT |
| 64 | 40.00% | 23.00% | 40.00% | 0.00% | $7,950 | $0 | $27,218 | 60 | 45.00% |
| 4 | 40.00% | 23.00% | 40.00% | 0.00% | $24,450 | $0 | $879 | 60 | 45.00% |
| 4 | 40.00% | 23.00% | 40.00% | 0.00% | $19,500 | $0 | $1,999 | 60 | 45.00% |
| 6 | 40.00% | 23.00% | 40.00% | 0.00% | $32,400 | $0 | $2,989 | 60 | 45.00% |
| 27 | 40.00% | 23.00% | 40.00% | 0.00% | $26,250 | $0 | $10,425 | 60 | 45.00% |
| 4 | 40.00% | 23.00% | 40.00% | 0.00% | $36,150 | $0 | $3,809 | 60 | 45.00% |
| 4 | 40.00% | 23.00% | 40.00% | 0.00% | $25,950 | $0 | $1,043 | 60 | 45.00% |
| 8 | 40.00% | 23.00% | 40.00% | 0.00% | $19,050 | $0 | $1,656 | 60 | 45.00% |
| 8 | 40.00% | 23.00% | 40.00% | 0.00% | $41,250 | $0 | $5,462 | 60 | 45.00% |
| 0 | 40.00% | 23.00% | 40.00% | 0.00% | $47,550 | $0 | $0 | 60 | 45.00% |
| 0 | 40.00% | 23.00% | 40.00% | 0.00% | $13,950 | $0 | $0 | 60 | 45.00% |
| 0 | 40.00% | 23.00% | 40.00% | 0.00% | $10,800 | $0 | $0 | 60 | 45.00% |
| 4 | 40.00% | 23.00% | 40.00% | 0.00% | $40,500 | $0 | $652 | 60 | 45.00% |
| 3 | 40.00% | 23.00% | 40.00% | 0.00% | $27,750 | $0 | $779 | 60 | 45.00% |
| 27 | 40.00% | 23.00% | 40.00% | 0.00% | $23,700 | $0 | $43,251 | 60 | 45.00% |
| 1 | 40.00% | 23.00% | 40.00% | 0.00% | $15,150 | $0 | $465 | 60 | 45.00% |
| 15 | 40.00% | 23.00% | 40.00% | 0.00% | $17,400 | $0 | $10,991 | 60 | 45.00% |
| 9 | 40.00% | 23.00% | 40.00% | 0.00% | $10,800 | $0 | $3,201 | 60 | 45.00% |
| 14 | 40.00% | 23.00% | 40.00% | 0.00% | $9,450 | $0 | $18,005 | 60 | 45.00% |
| 1 | 40.00% | 23.00% | 40.00% | 0.00% | $28,950 | $0 | $150 | 60 | 45.00% |
| 1 | 40.00% | 23.00% | 40.00% | 0.00% | $6,600 | $0 | $204 | 60 | 45.00% |
| 3 | 40.00% | 23.00% | 40.00% | 0.00% | $28,650 | $0 | $2,120 | 60 | 45.00% |
| 64 | 40.00% | 23.00% | 40.00% | 0.00% | $3,900 | $0 | $35,217 | 60 | 45.00% |
| 29 | 40.00% | 23.00% | 40.00% | 0.00% | $19,650 | $0 | $23,154 | 60 | 45.00% |
| 149 | 40.00% | 23.00% | 40.00% | 0.00% | $0 | $0 | $79,236 | 60 | 45.00% |
| 100 | 40.00% | 23.00% | 40.00% | 0.00% | $0 | $0 | $149,613 | 60 | 45.00% |

ADS 1460-5

FIG. 18

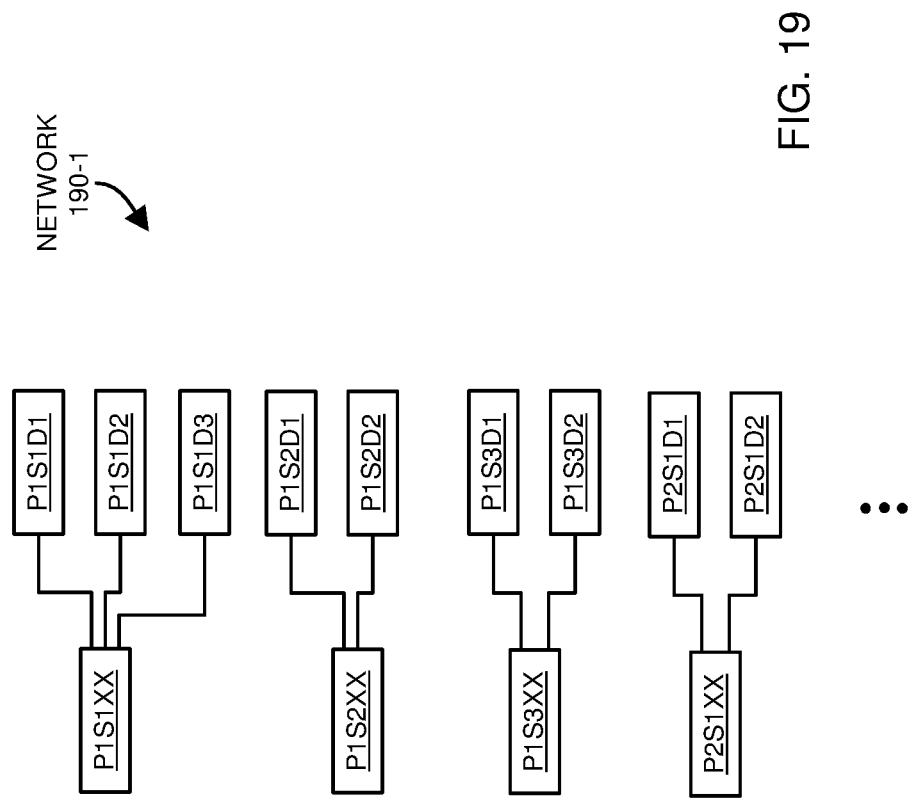

| A | B | C | D | E | F | G | H |
|---|---|---|---|---|---|---|---|
| Network Genome UUID (Universally Unique) | Network or Device Type (CM, CMTS, ...) | Downstream Network UUID's (Yes/No) | Upstream Network Genome UUID | Zip Code, SysLoc, or other general location | Vertex 1 Latitude of the UUID | Vertex 1 Longitude of the UUID | Vertex 1 Altitude of the UUID |
| N_UUID_NM | N_UUID_TYPE_NM | N_DWNSTRM_YN_FLAG | N_UPSTRM_UUID_NM | N_LOC_CODE | N_V1_LAT | N_V1_LON | N_V1_ALT |
| P1XXXX | PDC | Y | HE001 | 63131 | 38.733095 | -90.404642 | 624 |
| P1S1FF | FEEDF | Y | P1XXXX | 63131 | 38.733095 | -90.404642 | 624 |
| P1S1XX | SDC | Y | P1S1FF | 63131 | 38.733095 | -90.404642 | 624 |
| P1S2FF | FEEDF | Y | P1XXXX | 63131 | 38.733095 | -90.404642 | 624 |
| P1S2XX | SDC | Y | P1S2FF | 63131 | 38.727131 | -90.414589 | 584 |
| P1S3FF | FEEDF | Y | P1XXXX | 63131 | 38.733095 | -90.404642 | 624 |
| P1S3XX | SDC | Y | P1S3FF | 63131 | 38.734038 | -90.408086 | 624 |
| P1S1D1 | DISTF | N | P1S1XX | 63131 | 38.726098 | -90.407903 | 609 |
| P1S1D2 | DISTF | N | P1S1XX | 63131 | 38.727542 | -90.412474 | 604 |
| P1S1D3 | DISTF | N | P1S1XX | 63131 | 38.733509 | -90.406664 | 634 |
| P1S2D1 | DISTF | N | P1S2XX | 63131 | 38.72241 | -90.414524 | 536 |
| P1S2D2 | DISTF | N | P1S2XX | 63131 | 38.723247 | -90.414267 | 552 |
| P1S3D1 | DISTF | N | P1S3XX | 63131 | 38.738627 | -90.418761 | 515 |
| P1S3D2 | DISTF | N | P1S3XX | 63131 | 38.736017 | -90.40998 | 623 |
| P2XXXX | PDC | Y | HE001 | 63131 | 38.738425 | -90.41688 | 622 |
| P2S1FF | FEEDF | Y | P2XXXX | 63131 | 38.738425 | -90.41688 | 622 |
| P2S1XX | SDC | Y | P2S1FF | 63131 | 38.73626 | -90.412866 | 623 |
| P2S2FF | FEEDF | Y | P2XXXX | 63131 | 38.738425 | -90.41688 | 622 |
| P2S2XX | SDC | Y | P2S2FF | 63131 | 38.736656 | -90.418858 | 556 |
| P2S3FF | FEEDF | Y | P2XXXX | 63131 | 38.738425 | -90.41688 | 622 |
| P2S3XX | SDC | Y | P2S3FF | 63131 | 38.738531 | -90.427757 | 602 |
| P2S4FF | FEEDF | Y | P2XXXX | 63131 | 38.738425 | -90.41688 | 622 |
| P2S4XX | SDC | Y | P2S4FF | 63131 | 38.741794 | -90.435428 | 609 |
| P2S1D1 | DISTF | N | P2S1XX | 63131 | 38.733088 | -90.413917 | 552 |
| P2S1D2 | DISTF | N | P2S1XX | 63131 | 38.73673 | -90.425042 | 590 |
| P2S2D1 | DISTF | N | P2S2XX | 63131 | 38.729503 | -90.427478 | 509 |

...

ADS 2060-1

FIG. 20

ADS 2060-2

| I | J | K | L | M | N | O | P | Q |
|---|---|---|---|---|---|---|---|---|
| Vertex 2 Latitude of the UUID area | Vertex 2 Longitude of the UUID area | Vertex 2 Altitude of the UUID | Vertex 3 Latitude of the UUID area | Vertex 3 Longitude of the UUID area | Vertex 3 Altitude of the UUID | Vertex 4 Latitude of the UUID area | Vertex 4 Longitude of the UUID area | Vertex 4 Altitude of the UUID |
| N_V2_LAT | N_V2_LON | N_V2_ALT | N_V3_LAT | N_V3_LON | N_V3_ALT | N_V4_LAT | N_V4_LON | N_V4_ALT |
| 38.736095 | -90.404642 | | | | | | | |
| 38.727131 | -90.414589 | 624 | | | | | | |
| 38.734038 | -90.408086 | 584 | | | | | | |
| 38.725462 | -90.404813 | 624 | 38.73333 | -90.40211 | 599 | 38.734334 | -90.404813 | 630 |
| 38.722996 | -90.408359 | 622 | 38.731087 | -90.405629 | 630 | 38.734061 | -90.407952 | 626 |
| 38.735333 | -90.404454 | 556 | 38.737677 | -90.401257 | 599 | 38.740412 | -90.405223 | 615 |
| 38.722042 | -90.407937 | 606 | 38.724151 | -90.405741 | 586 | 38.727516 | -90.41107 | 592 |
| 38.72236 | -90.412593 | 566 | 38.727198 | -90.413087 | 603 | 38.727566 | -90.412245 | 517 |
| 38.728192 | -90.413955 | 525 | 38.734402 | -90.408869 | 620 | 38.733322 | -90.417189 | 584 |
| 38.734544 | -90.407866 | 587 | 38.740612 | -90.404926 | 623 | 38.740377 | -90.409368 | 569 |
| | | 628 | | | | | | |
| 38.736626 | -90.412866 | 623 | | | | | | |
| 38.736656 | -90.418858 | 556 | | | | | | |
| 38.738531 | -90.427757 | 602 | | | | | | |
| 38.741794 | -90.435428 | 609 | | | | | | |
| 38.734251 | -90.409883 | 615 | 38.741365 | -90.411557 | 545 | 38.741474 | -90.414582 | 544 |
| 38.733114 | -90.415515 | 558 | 38.741441 | -90.415741 | 535 | 38.74037 | -90.420623 | 601 |
| 38.72362 | -90.418423 | 530 | 38.737998 | -90.416749 | 617 | 38.736066 | -90.422703 | 532 |

ADS 2350

| COST_NAME | COST_VALUE | COST_SOURCE | |
|---|---|---|---|
| EPON_HEND_HE_CARD_CST | $93,000.00 | AE_FTTP | EPON Vaults Labor Cost per fiber foot -- underground only, where a $186.54 labor install is needed for vaults every 1000-1500 feet |
| EPON_HEND_HE_OPTIC_CST | $2,500.00 | AE_FTTP | EPON needs a Head End 24x10G Card for each 10,800 residential or 234 enterprise subscribers |
| EPON_HEND_OLT_CHASSIS_CST | $27,627.00 | AE_FTTP | EPON needs a Head End 10G DWDM Optic Unit for each 600 residential or 13 enterprise subscribers |
| EPON_HEND_OLT_CARD_CST | $9,050.00 | AE_FTTP | EPON requires an OLT Chassis for each 1024 residential or 512 enterprise subscribers |
| EPON_HEND_OLT_PORT_CST | $1,798.00 | AE_FTTP | EPON requires an OLT EPON Card for each 256 residential or 128 enterprise subscribers |
| EPON_HEND_OLT_LINK_CST | $2,500.00 | AE_FTTP | EPON needs an OLT Port for every 32 residential or 32 enterprise subscribers |
| EPON_HEND_L2_SWITCH_CST | $11,699.76 | AE_FTTP | EPON requires 2 OLT 10G Symmetrical links for each 512 residential or 32 enterprise subscribers |
| EPON_HEND_L2_DWDM_CST | $3,000.00 | AE_FTTP | EPON needs a Layer 2 Switch to accommodate up to 2 10G enterprise subscribers |
| EPON_CMTL_PDC_CST | $19,384.00 | AE_FTTP | EPON needs a Layer 2 Switch additional DWDM Optic Bi-Di Optic 10G to accommodate a 2nd enterprise subscriber on a Layer 2 Switch |
| EPON_CMTL_PDC_PED_CST | $0.00 | AE_FTTP | EPON requires a Primary Distribution Cabinet to accommodate 2000 residential or 500 enterprise passings |
| EPON_CMTL_SDC_CST | $9,021.00 | AE_FTTP | EPON PDC Pedestals are included in each Primary Distribution Cabinet |
| EPON_CMTL_SDC_PED_CST | $0.00 | AE_FTTP | EPON requires a Secondary Distribution Cabinet for each 432 residential or 144 enterprise passings |
| EPON_CMTL_SDC_SPLITTER_CST | $1,000.00 | AE_FTTP | EPON SDC Pedestals are included in the Secondary Distribution Cabinet |
| EPON_CMTL_TAP_PED_CST | $57.40 | FO_CS | EPON Secondary Cabinet 1:32 Splitters are needed to accommodate up to 32 subscribers ($800 for a 1:16 splitter) |
| EPON_CLBR_INDIRECT_LBR_CST | $10.00 | FO_CS | EPON Tap Pedestals are needed for each set of 4 HHP -- Underground only |
| EPON_CMTL_MST_TAPS_CST | $37.00 | FO_CS | EPON Indirect Labor Cost (for Design, Permitting, Engineering, Developer Fees/Restoration, etc.) |
| EPON_CMTL_VAULTS_CST | $0.21 | FO_CS | EPON MST, Taps Material Cost for each non-MDU passing |
| EPON_CLBR_VAULTS_CST | $0.13 | FO_CS | EPON Vaults Material Cost per fiber foot -- underground only, where a $301.22 vault is needed every 1000-1500 feet |
| EPON_CMTL_CASES_CST | $0.10 | FO_CS | EPON Vaults Labor Cost per fiber foot -- underground only, where a $186.54 labor install is needed for vaults every 1000-1500 feet |
| EPON_CLBR_CASES_CST | $0.13 | FO_CS | EPON Fiber Cases Material Cost per fiber foot -- aerial and underground, where a $150 case is placed every 1000-1500 feet |
| EPON_CMTL_CONSUM_CST | $0.08 | FO_CS | EPON Fiber Cases Labor Cost per fiber foot -- aerial and underground, where a $188.63 install is needed for cases placed 1500 feet |
| | | | EPON Consumables Material Cost per construction foot for Bonding, Grounding, etc. |

FIG. 23

| B | C | D | E | F | G | H | I |
|---|---|---|---|---|---|---|---|
| Aggregated Network Segment Name | Network Type | Network Genome UUID (Universally Unique Identifier) | Downstream Network Segment (Yes/No) | Upstream Network Segment (Name) | Colocation Network Segment #1 (Name) | Colocation Network Segment #2 (Name) | Colocation Network Segment #3 (Name) |
| N_SEG_NM | N_TYPE_C D | N_UUID_NM | N_DWNSTRM_YN_FLAG | N_UPSTRM_S EG_NM | N_COLO_SEG_1_NM | N_COLO_SEG_2_NM | N_COLO_SEG_3_NM |
| Input Network Segment Definitions (Naming and Geospatial) ==> | | | | | | | |
| E.P1XXXX | E | P1XXXX | Yes | n/a | n/a | n/a | n/a |
| E.P1S1XX | E | P1S1XX | Yes | P1XXXX | n/a | n/a | n/a |
| E.P1S2XX | E | P1S2XX | Yes | P1XXXX | n/a | n/a | n/a |
| E.P1S3XX | E | P1S3XX | Yes | P1XXXX | n/a | n/a | n/a |
| E.P1S1D1 | E | P1S1D1 | No | P1S1XX | C01XXX | n/a | n/a |
| E.P1S1D2 | E | P1S1D2 | No | P1S1XX | C02XXX | n/a | n/a |
| E.P1S1D3 | E | P1S1D3 | No | P1S1XX | n/a | n/a | n/a |
| E.P1S2D1 | E | P1S2D1 | No | P1S2XX | C01XXX | n/a | n/a |
| E.P1S2D2 | E | P1S2D2 | No | P1S2XX | C02XXX | n/a | n/a |
| E.P1S3D1 | E | P1S3D1 | No | P1S3XX | C03XXX | n/a | n/a |
| E.P1S3D2 | E | P1S3D2 | No | P1S3XX | C04XXX | n/a | n/a |
| E.C01XXX | E | C01XXX | Yes | P1XXXX | n/a | n/a | n/a |
| E.C02XXX | E | C02XXX | Yes | P1XXXX | n/a | n/a | n/a |

ADS 2460-1

FIG. 24A

| I | J | K | L | M | N | O | P | Q | R | S |
|---|---|---|---|---|---|---|---|---|---|---|
| Colocation Network Segment #3 (Name) | Colocation Network Segment #4 (Name) | Zip Code | Vertex 1 Latitude | Vertex 1 Longitude | Vertex 2 Latitude | Vertex 2 Longitude | Vertex 3 Latitude | Vertex 3 Longitude | Vertex 4 Latitude | Vertex 4 Longitude |
| N_COLO_SEG_3_NM | N_COLO_SEG_4_NM | N_ZIP_CODE | N_V1_LAT | N_V1_LON | N_V2_LAT | N_V2_LON | N_V3_LAT | N_V3_LON | N_V4_LAT | N_V4_LON |
| n/a | n/a | 63131 | | | | | | | | |
| n/a | n/a | 63131 | | | | | | | | |
| n/a | n/a | 63131 | | | | | | | | |
| n/a | n/a | 63131 | | | | | | | | |
| n/a | n/a | 63131 | 38.726098 | -90.407903 | 38.725452 | -90.404813 | 38.733330 | -90.402110 | 38.734334 | -90.404813 |
| n/a | n/a | 63131 | 38.727542 | -90.412474 | 38.722996 | -90.408359 | 38.731087 | -90.405629 | 38.734061 | -90.407952 |
| n/a | n/a | 63131 | 38.733509 | -90.406664 | 38.735333 | -90.404454 | 38.737677 | -90.401257 | 38.740412 | -90.405223 |
| n/a | n/a | 63131 | 38.722410 | -90.414524 | 38.722042 | -90.407937 | 38.724151 | -90.407551 | 38.727515 | -90.411070 |
| n/a | n/a | 63131 | 38.723247 | -90.414267 | 38.722380 | -90.412593 | 38.727198 | -90.413087 | 38.727566 | -90.419245 |
| n/a | n/a | 63131 | 38.728627 | -90.418761 | 38.728192 | -90.413955 | 38.734402 | -90.408869 | 38.733322 | -90.417189 |
| n/a | n/a | 63131 | 38.736017 | -90.409980 | 38.734544 | -90.407856 | 38.740612 | -90.404926 | 38.740377 | -90.409368 |
| n/a | n/a | 63131 | | | | | | | | |
| n/a | n/a | 63131 | | | | | | | | |

ADS 2460-1

FIG. 24B

| DL | DN | DO | DP | DQ | DR | DS | DT | DU | DV |
|---|---|---|---|---|---|---|---|---|---|
| EPON Head End 24x10G Cards | EPON Head End 10G DWDM Optic Units | EPON OLT Chassis | EPON OLT EPON Cards | EPON OLT Ports | EPON OLT 10G Uplinks | EPON Layer 2 Switch | EPON Layer 2 Switch DWDM Optic Bi-Dir Optic 10G | EPON Primary Distribution Cabinets | EPON Secondary Distribution Cabinets |
| N_EPON_HE_ CARD_CNT | N_EPON_ HE_10G_D WDM_OP TIC_CNT | N_EPON_OL T_CHASSIS_C NT | N_EPON_OL T_CARD_CNT | N_EPON_OL T_PORT_CNT | N_EPON_OL T_10G_UPLIN K_CNT | N_EPON_L2_ SWITCH_CNT | N_EPON_L2_ DWDM_CNT | N_EPON_PD C_CNT | N_EPON_SD C_CNT |
| Calculated Network Component Counts ==> | | | | | | | | | |
| 1 | 1 | 1 | 2 | 16 | 1 | 1 | 0 | 1 | 0 |
| 0 | 0 | 0 | 0 | 0 | 0 | 0 | 0 | 0 | 1 |
| 0 | 0 | 0 | 0 | 0 | 0 | 0 | 0 | 0 | 1 |
| 0 | 0 | 0 | 0 | 0 | 0 | 0 | 0 | 0 | 1 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

ADS 2460-2

| DV | DW | DX | DY | DZ | EA | EB | EC | ED | EE | EF | EG |
|---|---|---|---|---|---|---|---|---|---|---|---|
| EPON Secondary Cabinet Splitters | EPON Tap Pedestals | EPON Vaults | EPON Cases | EPON Voice Adapters | EPON Wifi Routers | EPON IP Video Converters | EPON ONU | RFoG CMTS | RFoG Head End Chassis | RFoG Head End TX/RX/Filter /Amps | RFoG Fiber Node |
| N_EPON_SD C_SPLITTER_ CNT | N_EPON_TA P_PED_CNT | N_EPON_VA ULT_CNT | N_EPON_CA SES_CNT | N_EPON_VOI CE_ADAPT_C NT | N_EPON_WI FI_RTR_CNT | N_EPON_IP_ VIDEO_CNVT _CNT | N_EPON_ON U_CNT | N_RFOG_CM TS_CNT | N_RFOG_HE_ CHASSIS_CNT | N_RFOG_HE_ TXRX_CNT | N_RFOG_NO DE_CNT |
| 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 0 | 7 | 1 | 5 | 47 | 47 | 102 | 47 | 0 | 0 | 0 | 0 |
| 0 | 10 | 2 | 7 | 67 | 67 | 145 | 67 | 0 | 0 | 0 | 0 |
| 0 | 8 | 2 | 6 | 54 | 54 | 117 | 54 | 0 | 0 | 0 | 0 |
| 0 | 13 | 1 | 5 | 88 | 88 | 190 | 88 | 0 | 0 | 0 | 0 |
| 0 | 12 | 1 | 5 | 81 | 81 | 175 | 81 | 0 | 0 | 0 | 0 |
| 0 | 14 | 2 | 8 | 98 | 98 | 211 | 98 | 0 | 0 | 0 | 0 |
| 0 | 10 | 2 | 6 | 71 | 71 | 153 | 71 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

ADS 2460-2

| FC | FD | FE | FF | FG | FH | FI | FJ | FK | FL | FM |
|---|---|---|---|---|---|---|---|---|---|---|
| EPON Head End 24x10G Card Cost | EPON Head End 10G DWDM Optic Unit Cost | EPON OLT Chassis Cost | EPON OLT EPON Card Cost | EPON OLT Port Cost | EPON OLT 10G Uplink Cost | EPON Layer 2 Switch Fixed Setup Cost | EPON Layer 2 Switch DWDM Optic Bi-Di Optic 10G Cost | EPON Primary Cabinet Fixed Setup Cost | EPON Primary Cabinet Pedestal Cost | EPON Secondary Cabinet Fixed Setup Cost |
| N_EPON_HE ND_HE_CAR D_CST | N_EPON_HE ND_HE_OPTI C_CST | N_EPON_HE ND_OLT_CH ASSIS_CST | N_EPON_HE ND_OLT_CAR D_CST | N_EPON_HE ND_OLT_PO RT_CST | N_EPON_HE ND_OLT_UN K_CST | N_EPON_HE ND_L2_SWH CH_CST | N_EPON_HE ND_L2_DWD M_CST | N_EPON_CM TL_PDC_CST | N_EPON_CM TL_PDC_PED _CST | N_EPON_CM TL_SDC_CST |
| Calculated Network Costs ==> | | | | | | | | | | |
| $9,300 | $250 | $2,763 | $1,810 | $2,877 | $250 | $0 | $0 | $1,938 | $0 | $0 |
| $0 | $0 | $0 | $0 | $0 | $0 | $0 | $0 | $0 | $0 | $902 |
| $0 | $0 | $0 | $0 | $0 | $0 | $0 | $0 | $0 | $0 | $902 |
| $0 | $0 | $0 | $0 | $0 | $0 | $0 | $0 | $0 | $0 | $902 |
| $0 | $0 | $0 | $0 | $0 | $0 | $0 | $0 | $0 | $0 | $0 |
| $0 | $0 | $0 | $0 | $0 | $0 | $0 | $0 | $0 | $0 | $0 |
| $0 | $0 | $0 | $0 | $0 | $0 | $0 | $0 | $0 | $0 | $0 |
| $0 | $0 | $0 | $0 | $0 | $0 | $0 | $0 | $0 | $0 | $0 |
| $0 | $0 | $0 | $0 | $0 | $0 | $0 | $0 | $0 | $0 | $0 |
| $0 | $0 | $0 | $0 | $0 | $0 | $0 | $0 | $0 | $0 | $0 |

ADS 2460-3

FIG. 26A

| | FN | FO | FP | FQ | FR | FS | FT | FU | FV | FW | FX | FY |
|---|---|---|---|---|---|---|---|---|---|---|---|---|
| | EPON Secondary Cabinet Pedestal Cost | EPON Secondary Cabinet Splitter Cost | EPON Tap Pedestal Cost | EPON MST, Taps Material Cost (for non-MDU passings) | EPON Vaults Material Cost | EPON Fiber Cases Material Cost | EPON Consumables Material Cost for Bonding, Grounding, etc. | EPON Fiber Cable Material Cost | EPON Fiber Conduit Material Cost | EPON Indirect Labor Cost (for Design, Permitting, Engineering, etc.) | EPON Vaults Labor Cost | EPON Fiber Cases Labor Cost |
| | N_EPON_CM TL_SDC_PED_ CST | N_EPON_CM TL_SDC_SPLI TTER_CST | N_EPON_CM TL_TAP_PED_ CST | N_EPON_CM TL_MST_TAP S_CST | N_EPON_CM TL_VAULTS_ CST | N_EPON_CM TL_CASES_CS T | N_EPON_CM TL_CONSUM_ CST | N_EPON_CM TL_FIBER_CST | N_EPON_CM TL_CONDUIT _CST | N_EPON_CLB R_INDIRECT_ LBR_CST | N_EPON_CLB R_VAULTS_C ST | N_EPON_CLB R_CASES_CST |
| | $0 | $0 | $0 | $0 | $0 | $0 | $0 | $0 | $0 | $0 | $0 | $0 |
| | $0 | $600 | $0 | $0 | $0 | $0 | $0 | $0 | $0 | $0 | $0 | $0 |
| | $0 | $600 | $0 | $0 | $0 | $0 | $29 | $106 | $39 | $0 | $0 | $0 |
| | $0 | $600 | $0 | $0 | $0 | $0 | $9 | $34 | $12 | $0 | $0 | $0 |
| | $0 | $0 | $40 | $433 | $30 | $75 | $53 | $191 | $71 | $117 | $19 | $94 |
| | $0 | $0 | $57 | $618 | $60 | $105 | $75 | $272 | $101 | $167 | $37 | $132 |
| | $0 | $0 | $46 | $496 | $60 | $90 | $60 | $218 | $81 | $134 | $37 | $113 |
| | $0 | $0 | $75 | $821 | $30 | $75 | $54 | $196 | $73 | $222 | $19 | $94 |
| | $0 | $0 | $69 | $747 | $30 | $75 | $49 | $178 | $66 | $202 | $19 | $94 |
| | $0 | $0 | $80 | $907 | $60 | $120 | $92 | $333 | $124 | $245 | $37 | $151 |
| | $0 | $0 | $57 | $655 | $60 | $90 | $66 | $240 | $89 | $177 | $37 | $113 |
| | $0 | $0 | $0 | $0 | $0 | $0 | $0 | $0 | $0 | $0 | $0 | $0 |
| | $0 | $0 | $0 | $0 | $0 | $0 | $0 | $0 | $0 | $0 | $0 | $0 |

ADS 2460-3

FIG. 26B

| | R | S | T | U | V | W | X | Y | Z | AA | AB |
|---|---|---|---|---|---|---|---|---|---|---|---|
| | Vertex 4 Latitude | Vertex 4 Longitude | EPON Head End 24x10G Cards | EPON Head End 10G DWDM Optic Units | EPON OLT Chassis | EPON OLT EPON Cards | EPON OLT Ports | EPON OLT 10G Uplinks | EPON Layer 2 Switch | EPON Layer 2 Switch DWDM Optic Bi-Dir Optic 10G | EPON PDC |
| | N_V4_LAT | N_V4_LON | N_EPON_HE_CARD_IN | N_EPON_HE_10G_DWDM_OPTIC_IN | N_EPON_OLT_CHASSIS_IN | N_EPON_OLT_CARD_IN | N_EPON_OLT_PORT_IN | N_EPON_OLT_10G_UPLN_K_IN | N_EPON_L2_SWITCH_IN | N_EPON_L2_DWDM_IN | N_EPON_PD C_IN |
| | | | Input Network Segment Definitions (Components and Component Count Calculation Overri | | | | | | | | |
| | | | -1 | -1 | -1 | -1 | -1 | -1 | -1 | -1 | 1 |
| | 38.734334 | -90.404813 | 0 | 0 | 0 | 0 | 0 | 0 | -1 | -1 | 0 |
| | 38.734061 | -90.407952 | 0 | 0 | 0 | 0 | 0 | 0 | -1 | -1 | 0 |
| | 38.740412 | -90.405223 | 0 | 0 | 0 | 0 | 0 | 0 | -1 | -1 | 0 |
| | 38.727516 | -90.411070 | 0 | 0 | 0 | 0 | 0 | 0 | -1 | -1 | 0 |
| | 38.727566 | -90.419245 | 0 | 0 | 0 | 0 | 0 | 0 | -1 | -1 | 0 |
| | 38.733322 | -90.417189 | 0 | 0 | 0 | 0 | 0 | 0 | -1 | -1 | 0 |
| | 38.740377 | -90.409368 | 0 | 0 | 0 | 0 | 0 | 0 | -1 | -1 | 0 |

ADS 2460-4

FIG. 27A

| AC | AD | AE | AF | AG | AH | AI | AJ | AK | AL | AM | AN |
|---|---|---|---|---|---|---|---|---|---|---|---|
| EPON Secondary Cabinet | EPON Secondary Cabinet Splitters | EPON Tap Pedestals | EPON Vaults | EPON Cases | EPON Voice Adapters | EPON WiFi Routers | EPON IP Video Converters | EPON ONU | RFoG CMTS | RFoG Head End Chassis | RFoG Head End TX/RX/Filter /Amps |
| N_EPON_SD C_IN | N_EPON_SD C_SPLITTER_I N | N_EPON_TA P_PED_IN | N_EPON_VA ULT_IN | N_EPON_CA SES_IN | N_EPON_VO CE_ADAPT_I N | N_EPON_WI FI_RTR_IN | N_EPON_IP_ VIDEO_CNVT _IN | N_EPON_ON U_IN | N_RFOG_CM TS_IN | N_RFOG_HE _CHASSIS_IN | N_RFOG_HE_ TXRX_IN |
| 0 | 0 | 0 | 0 | 0 | 0 | 0 | 0 | 0 | 0 | 0 | 0 |
| 1 | -1 | 0 | 0 | 0 | 0 | 0 | 0 | 0 | 0 | 0 | 0 |
| 1 | -1 | 0 | 0 | 0 | 0 | 0 | 0 | 0 | 0 | 0 | 0 |
| 1 | -1 | 0 | 0 | 0 | 0 | 0 | 0 | 0 | 0 | 0 | 0 |
| 0 | 0 | -1 | -1 | -1 | -1 | -1 | -1 | -1 | -1 | 0 | 0 |
| 0 | 0 | -1 | -1 | -1 | -1 | -1 | -1 | -1 | -1 | 0 | 0 |
| 0 | 0 | -1 | -1 | -1 | -1 | -1 | -1 | -1 | -1 | 0 | 0 |
| 0 | 0 | -1 | -1 | -1 | -1 | -1 | -1 | -1 | -1 | 0 | 0 |
| 0 | 0 | -1 | -1 | -1 | -1 | -1 | -1 | -1 | -1 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

FIG. 27B

| CI | CJ | CK | CL | CM | CN | CO | CP | CQ | CR | CS | CT |
|---|---|---|---|---|---|---|---|---|---|---|---|
| Conversion % (#MDU subscribers/ #MDU passings) | Telespend $ MRR ($Resi spend/mo * #Resi passings) | Telespend $ MRR ($Enterprise spend/mo * #Enterprise passings) | Telespend $ MRR ($SMB spend/mo * #SMB passings) | Telespend Revenue Months | Telespend based Operating Costs % | #Subscribers Residential | #Subscribers Enterprise | #Subscribers SMB | #Non MDU Subscribers | #Subscribers Total | Total UG Percent |
| N_CONV_M DU_PCT | N_TSPEND_R ESI_MRR | N_TSPEND_E NT_MRR | N_TSPEND_S MB_MRR | N_TSPEND_R EV_MOS_CN T | N_TSPEND_O P_COST_PCT | N_SUBSCRIBE R_RESI_CNT | N_SUBSCRIBE R_ENT_CNT | N_SUBSCRIBE R_SMB_CNT | N_SUBSCRIBE R_MDU_CNT | N_SUBSCRIBE R_TTL_CNT | N_UG_TTL_P CT |
| | | | | | | Calculated Network Distances, Subtotals, and Percentages ==> | | | | | |
| 0% | $0 | $0 | $0 | 60 | 45% | 460 | 0 | 45 | 0 | 505 | 22% |
| 0% | $0 | $0 | $0 | 60 | 45% | 138 | 0 | 29 | 0 | 167 | 22% |
| 0% | $0 | $0 | $0 | 60 | 45% | 156 | 0 | 13 | 0 | 169 | 22% |
| 0% | $0 | $0 | $0 | 60 | 45% | 166 | 0 | 3 | 0 | 169 | 22% |
| 0% | $795 | $0 | $2,221 | 60 | 45% | 21 | 0 | 26 | 0 | 47 | 22% |
| 0% | $2,445 | $0 | $88 | 60 | 45% | 65 | 0 | 2 | 0 | 67 | 22% |
| 0% | $1,950 | $0 | $200 | 60 | 45% | 52 | 0 | 2 | 0 | 54 | 22% |
| 0% | $3,240 | $0 | $2,989 | 60 | 45% | 86 | 0 | 2 | 0 | 88 | 22% |
| 0% | $2,625 | $0 | $1,043 | 60 | 45% | 70 | 0 | 11 | 0 | 81 | 22% |
| 0% | $3,615 | $0 | $381 | 60 | 45% | 96 | 0 | 2 | 0 | 98 | 22% |
| 0% | $2,595 | $0 | $104 | 60 | 45% | 69 | 0 | 2 | 0 | 71 | 22% |
| 0% | $0 | $0 | $0 | 60 | 45% | 0 | 0 | 0 | 0 | 0 | 22% |
| 0% | $0 | $0 | $0 | 60 | 45% | 0 | 0 | 0 | 0 | 0 | 22% |
| 0% | $0 | $0 | $0 | 60 | 45% | 0 | 0 | 0 | 0 | 0 | 22% |
| 0% | $0 | $0 | $0 | 60 | 45% | 0 | 0 | 0 | 0 | 0 | 22% |

ADS 2460-5

FIG. 28A

ADS 2460-5

| CU | CV | CW | CX | CY | CZ | DA | DB | DC | DD | DE | DF |
|---|---|---|---|---|---|---|---|---|---|---|---|
| #Total Non MDU Passings | #Total Passings | Percent of Network made up of Fiber | Percent of Network made up of Coax | Co Location Distance (miles) | Fiber Aerial OL Distance (ft) | Fiber Colo Distance (ft) | Fiber Joint Trench Distance (ft) | Fiber Plow Trench Distance (ft) | Fiber Direct Bore Distance (ft) | Fiber VDuct Distance (ft) | Coax Aerial OL Distance (ft) |
| N_PASSINGS_NONMDU_CNT | N_PASSINGS_TTL_CNT | N_FIBER_PCT | N_COAX_PCT | N_COLO_DIST_MI | N_EPON_AERIAL_OL_FT | N_EPON_CO_LO_FT | N_EPON_UG_JTRENCH_FT | N_EPON_UG_PTRENCH_FT | N_EPON_UG_DBORE_FT | N_EPON_UG_VDUCT_FT | N_HFC_AERIAL_OL_FT |
| 1264 | 1264 | 0% | 0% | 0.00000 | 0 | 0 | 0 | 0 | 0 | 0 | 0 |
| 418 | 418 | 0% | 0% | 0.00000 | 0 | 0 | 0 | 0 | 0 | 0 | 0 |
| 424 | 424 | 100% | 0% | 0.50777 | 755 | 2681 | 0 | 213 | 0 | 0 | 0 |
| 422 | 422 | 100% | 0% | 0.15417 | 269 | 814 | 0 | 76 | 0 | 0 | 0 |
| 117 | 117 | 100% | 0% | 0.00000 | 5140 | 0 | 0 | 1450 | 0 | 0 | 0 |
| 167 | 167 | 100% | 0% | 0.50777 | 5220 | 2681 | 0 | 1472 | 0 | 0 | 0 |
| 134 | 134 | 100% | 0% | 0.15417 | 5220 | 814 | 0 | 1472 | 0 | 0 | 0 |
| 222 | 222 | 100% | 0% | 0.14015 | 4687 | 740 | 0 | 1322 | 0 | 0 | 0 |
| 202 | 202 | 100% | 0% | 0.14015 | 4198 | 740 | 0 | 1184 | 0 | 0 | 0 |
| 245 | 245 | 100% | 0% | 0.04735 | 8749 | 250 | 0 | 2468 | 0 | 0 | 0 |
| 177 | 177 | 100% | 0% | 0.04734 | 6260 | 250 | 0 | 1766 | 0 | 0 | 0 |
| 0 | 0 | 0% | 0% | 0.00000 | 0 | 0 | 0 | 0 | 0 | 0 | 0 |
| 0 | 0 | 0% | 0% | 0.00000 | 0 | 0 | 0 | 0 | 0 | 0 | 0 |

FIG. 28B

ADS 2460-6

| Solution Value (Build=1, NoBuild=0) | SOS Type 1 Set Name | MILP O/1 Column Name | | Total Revenue - Cost ($) | Total Annual Revenue ($) | Total CAPEX Cost ($) | Total Head End Cost ($) | Total Construction Labor Cost ($) | Total Construction Material Cost ($) |
|---|---|---|---|---|---|---|---|---|---|
| SOLN_VALUE | SOS_NM | COL_NM | | TOT_REV_COST | TOT_REV | TOT_CAPEX | TOT_HEND_C OST | TOT_CLBR_COST | TOT_CMTL_C OST |
| Optimizer = | E.STL71 | STL71 | | $1,162,677 | $568,197 | $399,864 | $48,723 | $972,694 | $66,669 |
| 1 | E.P1XXXX | P1XXXX | | -$19,273.00 | $0 | $19,273 | $1,725 | $85.10 | $1,938 |
| 1 | E.P1S1XX | P1S1XX | | -$1,587.20 | $0 | $1,587 | $0 | $85.10 | $1,502 |
| 1 | E.P1S2XX | P1S2XX | | -$2,206.65 | $0 | $2,207 | $0 | $530.20 | $1,676 |
| 1 | E.P1S3XX | P1S3XX | | -$1,785.93 | $0 | $1,786 | $0 | $228.45 | $155 |
| 1 | E.P1S1D1 | P1S1D1 | | $32,162.37 | $14,481 | $7,659 | $0 | $2,146.36 | $893 |
| 1 | E.P1S1D2 | P1S1D2 | | $22,640.84 | $12,158 | $10,793 | $0 | $2,925.08 | $1,288 |
| 1 | E.P1S1D3 | P1S1D3 | | $1,959.31 | $10,320 | $8,786 | $0 | $2,429.75 | $1,051 |
| 1 | E.P1S2D1 | P1S2D1 | | $33,746.70 | $16,987 | $12,967 | $0 | $3,007.35 | $1,324 |
| 1 | E.P1S2D2 | P1S2D2 | | $36,506.52 | $17,604 | $11,904 | $0 | $2,740.03 | $1,214 |
| 1 | E.P1S3D1 | P1S3D1 | | $37,364.22 | $19,180 | $15,382 | $0 | $4,058.14 | $1,715 |
| 1 | E.P1S3D2 | P1S3D2 | | $24,468.26 | $12,957 | $11,163 | $0 | $2,941.32 | $1,258 |
| 1 | E.C01XXX | C01XXX | | $0.00 | $0 | $0 | $0 | $0.00 | $0 |
| 1 | E.C02XXX | C02XXX | | $0.00 | $0 | $0 | $0 | $0.00 | $0 |

FIG. 29A

ADS 2460-6

| JO | JP | JQ | JR | JS | JT | JU | JV | JW | JX | JY |
|---|---|---|---|---|---|---|---|---|---|---|
| Total Premise Cost Labor+Material ($) | Total Annual Operating Cost ($) | Total Construction Distance (Miles) | Total Installs | Total Construction Time (Months) | Year 01 Cumulative Free Cashflow | Year 02 Cumulative Free Cashflow | Year 03 Cumulative Free Cashflow | Year 04 Cumulative Free Cashflow | Year 05 Cumulative Free Cashflow | Construction Cost per Connected Customer |
| TOT_PREM_COST | TOT_OPEX | TOT_CONSTR_MI | TOT_INSTALLS | TOT_CONSTR_MOS | TOT_CASHFLOW_YR1 | TOT_CASHFLOW_YR2 | TOT_CASHFLOW_YR3 | TOT_CASHFLOW_YR4 | TOT_CASHFLOW_YR5 | TOT_CONSTR_COST_PER_CONNECTED_CUSTOMER |
| $187,203 | $255,688 | 58.668 | 1908 | 2.667 | ($87,356) | $225,152 | $537,660 | $850,169 | $1,162,677 | $86 |
| $0 | $0 | 0 | 0 | 0.000 | ($19,273) | ($19,273) | ($19,273) | ($19,273) | ($19,273) | $0 |
| $0 | $0 | 0 | 0 | 0.000 | ($1,587) | ($1,587) | ($1,587) | ($1,587) | ($1,587) | $0 |
| $0 | $0 | 0.18333 | 0 | 0.008 | ($2,207) | ($2,207) | ($2,207) | ($2,207) | ($2,207) | $0 |
| $0 | $0 | 0.06534 | 0 | 0.003 | ($1,786) | ($1,786) | ($1,786) | ($1,786) | ($1,786) | $0 |
| $4,620 | $6,516 | 1.24811 | 47 | 0.057 | $305 | $8,269 | $16,234 | $24,198 | $32,162 | $65 |
| $6,580 | $5,471 | 1.26742 | 67 | 0.058 | ($4,107) | $2,580 | $9,267 | $15,954 | $22,641 | $63 |
| $5,305 | $4,644 | 1.26742 | 54 | 0.058 | ($3,110) | $2,566 | $8,242 | $13,917 | $19,593 | $64 |
| $8,636 | $7,644 | 1.13807 | 88 | 0.052 | ($3,624) | $5,719 | $15,061 | $24,404 | $33,747 | $49 |
| $7,951 | $792 | 1.01932 | 81 | 0.046 | ($2,222) | $7,460 | $17,142 | $26,824 | $36,507 | $49 |
| $9,609 | $8,631 | 2.12443 | 98 | 0.097 | ($4,832) | $5,717 | $16,266 | $26,815 | $37,364 | $49 |
| $6,963 | $5,830 | 1.52008 | 71 | 0.069 | ($4,036) | $3,090 | $10,216 | $17,342 | $24,468 | $59 |
| $0 | $0 | 0.50777 | 0 | 0.023 | $0 | $0 | $0 | $0 | $0 | 58.9.9595 |
| $0 | $0 | 0.15417 | 0 | 0.007 | $0 | $0 | $0 | $0 | $0 | $0 |

FIG. 29B

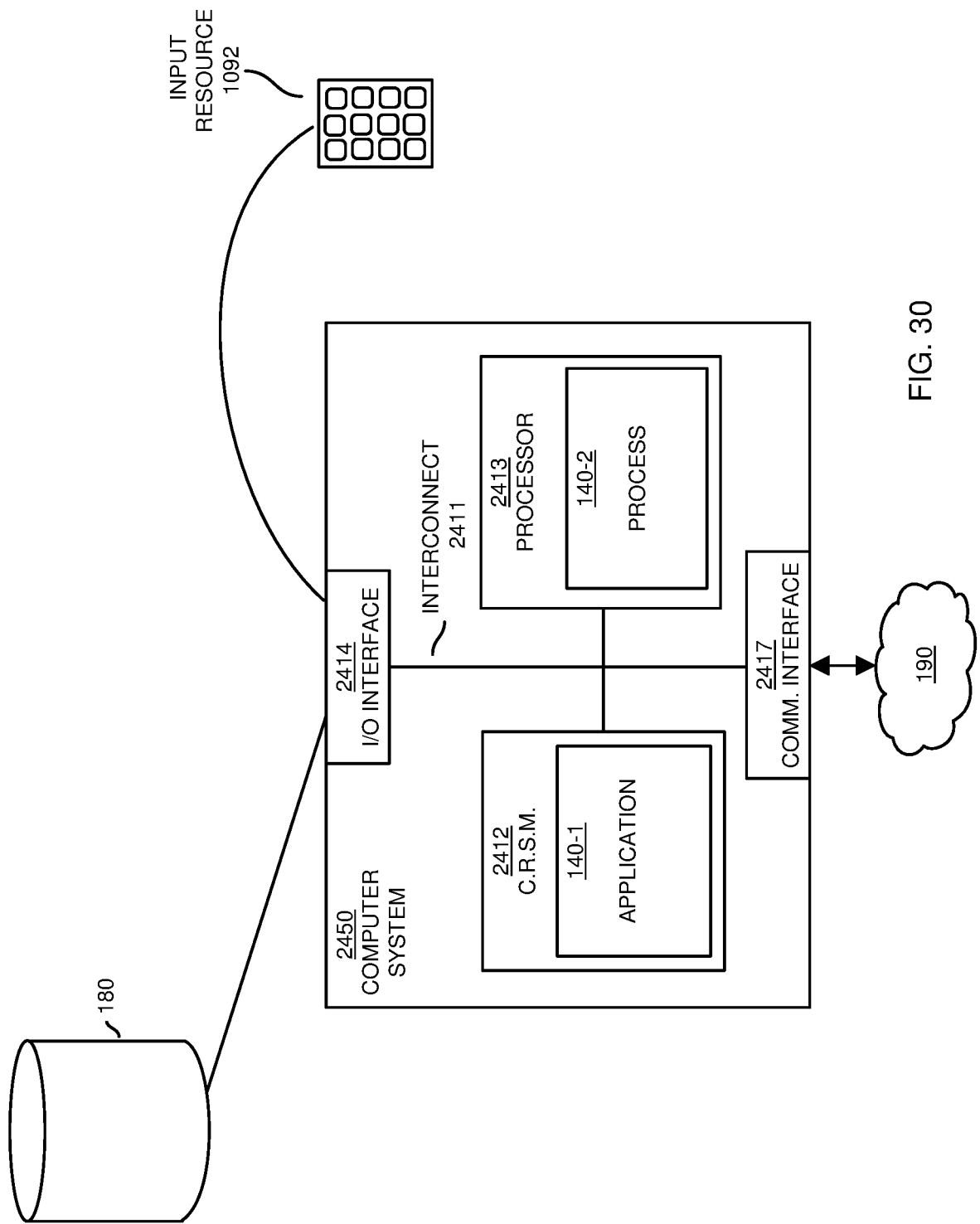

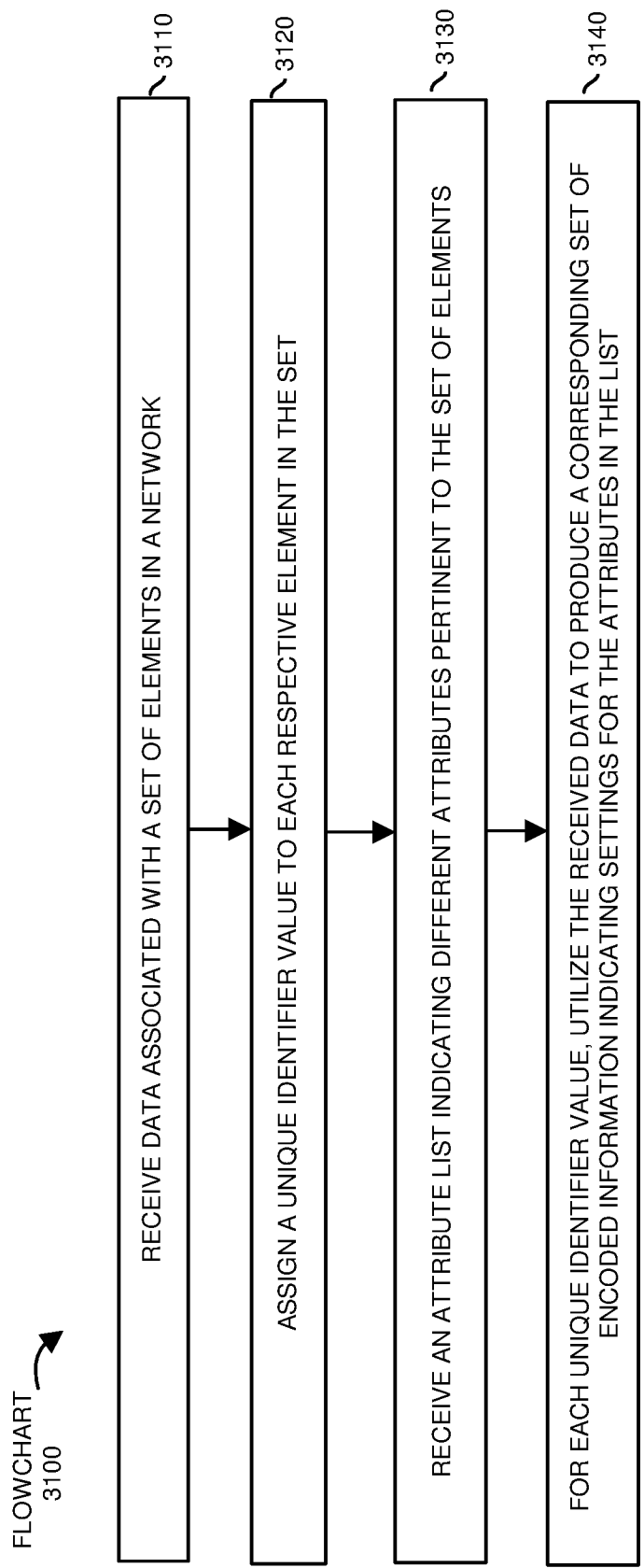

UNIVERSAL ALIAS AND DEPENDENCY MODELS AND NETWORK ANALYSIS

BACKGROUND

Conventional service delivery platforms include those directly and entirely dependent on physical infrastructure (access network inside/outside plant), such as high speed Internet and commercial Ethernet services; those that are partially dependent on infrastructure (Hybrid Fiber Coax delivery of legacy digital video services are a hybrid, delivering digital video content by direct placement on the HFC network, while using existing DOCSIS infrastructure for delivery of control signaling, note that DOCSIS is not just control signaling, it is the key technology for high speed internet over cable), and those that depend on access network infrastructure for delivery (such as wireline telephone services and web-based services including over-the-top video.) Note that even if the physical infrastructure is hybrid fiber cable (HFC), the delivery platform is still dependent on the physical infrastructure.

Premise devices (such as cable modems, set-top boxes, telephony adapters, gateways, subscriber-owned equipment, and the like) ultimately leverage the subscriber's physical network connection (generally a drop connection on an HFC network), but rely on numerous provider endpoints to deliver a full suite of services (such as CMTS, various video service platforms, telephony switches, and an array of back-office systems that are usually not directly visible to subscribers but are critical path elements nonetheless.)

Each of these service platforms (whether directly visible to subscribers or part of the back-office environment) are accountable in different ways to a wide range of internal organizations for engineering design (initial configuration management, architecture and engineering, engineering rules, network simulation, costing, etc.) and operational management (performance assessment/monitoring, repair, and to an extent, ongoing configuration changes).

For example, each HFC network Node has a network identifier or name symbol (this varies amongst different companies) on which periodic measures of plant performance are reported; the recipients for these reports are various levels within the field operations and engineering organization. Similarly, equipment that is not directly attached to access infrastructure (such as a provisioning server for high speed internet platform) is named (perhaps its IP address or network name) and cataloged for the purpose of inventory, operational monitoring and management.

BRIEF DESCRIPTION OF EMBODIMENTS

There are deficiencies associated with use of conventional network component names and relationships to define a specific network. For example, there are many classes of network service equipment (and by extension, software programs executing on servers that have significance, but are not themselves physical pieces of equipment). There is typically not a consistent (or in many cases, any) inventory of network assets that reflect the life cycle of these devices, software programs and systems. Additionally, there is typically no data set reflecting interconnect relationships (such as connection relationships and interconnectivity reflecting physical and logical interrelationships) among the network devices.

Embodiments herein include novel ways of generating one or more analytics data sets describing a respective network (such as network component working relationships associated with a respective network and/or network sub-segments) and using the one or more generated data set for advanced analytics purposes such as deriving models, simulating networks, optimizing costs, optimizing configurations to best consume network resources, etc. Further, as discussed herein, the interconnectivity of network components in a structured way allows end-to-end systems, and sub-segments of systems, to be analyzed where it was previously impossible due to lack of any formal definition of the physical and logical interrelationships.

More specifically, in accordance with embodiments herein, computer processor hardware receives (raw) data associated with a set of elements in a network. Each of the elements can represent any suitable entity such as a single device (computer, switch, router, repeater, fiber optic link, coaxial link, etc.), a network segment including different types of interconnected devices or equipment, a sub-network part of a bigger network, etc. The raw data can includes any suitable information describing a respective network element.

Initially, the computer processor hardware assigns a unique identifier value (a.k.a. UUID or Universally Unique Identifier) to each respective element in the network that is to be included in a respective network description (analytics data set). The assigned unique identifier values assigned to the network elements distinguish the network elements from each other in the analytics data set.

In furtherance of creating a specific network description or analytics data set, the computer processor hardware obtains an attribute list (selected based on the particular type of network being encoded or described) indicating different attributes pertinent to the set of network elements and corresponding type of network being described by an analytics data set. Accordingly, the attribute list indicates attributes associated with a specific type of network in which the set of network elements reside.

For each unique identifier value (indicating a corresponding network element in the network), the computer processor hardware utilizes the received (raw) data associated with the corresponding network element to produce a corresponding set of encoded information (or record) indicating settings for the attributes in the list. In this manner, the computer processor hardware produces a set of encoded data (record) for each element in the network.

In accordance with further embodiments, the computer processor hardware combines the produced corresponding set of encoded information (such as a record) for each of the unique identifier values into an analytics data set defining the specific network (or network subset, sub-segment, etc.) in which the set of network elements reside. If desired, the analytics data set can be or include columns and rows of data to describe a respective network. For example, in one embodiment, for each unique identifier value assigned to a corresponding network element, the computer processor hardware produces a corresponding set of information (such as a row of data or record) to include a setting for each of the different attributes in the attribute list as previously discussed.

Note that the different attributes in the attribute list (which may vary depending on a chosen type of network to be defined) can include or indicate any suitable parameters depending on the type of network being encoded via an analytics data set. For example, the attributes for defining encoded information for a particular type of network can include one or more of the following: i) an identifier attribute indicating a unique identifier value assigned to each network element, ii) one or more connectivity attributes indicating connectivity of a particular network element with respect to other network elements in the network, iii) one or more location attributes indicating a geographical location of the network element or geographical region in which the respective network element resides, iv) one or more type attributes indicating a type associated with the network element, v) one or more attributes indicating a number of consumer passings and/or subscribers served by or potentially served by the respective the network element, vi) costs associated with maintenance and/or installation of the respective network element, etc.

In accordance with further embodiments, different attribute lists are available to produce a respective description of different types of networks. In one embodiment, a respective attribute list is tailored to accommodate description of different types of networks. For example, when producing a description for an optical network, the corresponding attribute list chosen by the computer processor hardware includes attributes pertinent to describing entities in optical networks; when producing a description for a coaxial cable network, the corresponding attribute list chosen by the computer processor hardware includes attributes pertinent to describing entities in a coaxial cable; when producing a description for an HFC (Hybrid Fiber Coax) network, the corresponding attribute list chosen by the computer processor hardware includes attributes pertinent to describing entities in an HFC network; and so on.

Subsequent to generating the description (the encoded information or analytics data set) for a chosen type of network, the analytics data set can be used for any suitable purpose. For example, one embodiment herein includes applying supplemental data to enrich the description of the network to produce one or more additional analytics data sets or models of interest. In response to receiving a command from a user or other resource to generate a model, the computer processor hardware derives a chosen network model (such as a cost model, return-on-investment model, etc.) from the analytics data set defining the network.

In one embodiment, to derive a chosen model or expand an analytics data set, the computer processor hardware receives or retrieves supplemental data with respect to a core analytics data set. The computer processor hardware then applies the supplemental data (such as cost information) to the analytics data set (encoded information) to produce an expanded analytics data set. From the expanded analytics data set, the computer processor hardware can generate a network model (e.g., genome network development model, cost/revenue optimization model, capacity planning model, simulation model, network performance model, network growth model, etc.), providing advanced analytics for subsequent use by a suitable entity.

These and other more specific additional embodiments are disclosed herein as further discussed below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a device. The instructions, when executed by computer processor hardware, cause the computer processor hardware (such as one or more processor devices) to: receive data associated with a set of elements in a network; assign a unique identifier value to each respective element in the set; receive an attribute list indicating different attributes pertinent to the set of elements; and for each unique identifier value, utilize the received data to produce a corresponding set of encoded information indicating settings for the attributes in the list.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of managing a network environment of multiple network elements. However, it should be noted that embodiments herein are not limited to use in such applications and that the techniques discussed herein are well suited for other applications as well. Specifically, embodiments herein can be applied anywhere that interdependencies and interconnectivity are imperative for the successful operation of the system.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating an attribute list according to embodiments herein.

FIG. 3 is an example diagram illustrating a detailed attribute list according to embodiments herein.

FIG. 4 is an example diagram illustrating an analytics data set defining a network according to embodiments herein.

FIGS. 8-10 are example diagrams illustrating encoded information defining a respective network a according to embodiments herein.

FIG. 12 is an example diagram illustrating encoded information defining a respective network a according to embodiments herein.

FIG. 13 is an example diagram illustrating a relationship of network elements derived from the encoded information in FIG. 12 according to embodiments herein.

FIGS. 14-18 are example diagrams illustrating encoded information defining a respective network a according to embodiments herein.

FIG. 19 is an example diagram illustrating a relationship of network elements derived from the encoded information in FIGS. 14-18 according to embodiments herein.

FIGS. 20-21 are example diagrams illustrating encoded information defining a respective network a according to embodiments herein.

FIG. 23 is an example diagram illustrating an analytics data set including supplemental cost data associated with components potentially found in a respective network according to embodiments herein.

FIGS. 24A and 24B are examples diagram illustrating a first portion of an analytics data set indicating connectivity of network components according to embodiments herein.

FIGS. 25A and 25B are example diagrams illustrating a coefficient matrix according to embodiments herein.

FIGS. 26A and 26B are example diagrams illustrating cost information associated with network elements according to embodiments herein.

FIGS. 27A and 2 are example diagrams illustrating of an analytics data set according to embodiments herein.

FIGS. 28A and 28B are example diagrams illustrating calculated network costs based on application of the cost matrix to supplemental cost data according to embodiments herein.

FIGS. 29A and 29B are example diagrams illustrating generation of financial information and model according to embodiments herein.

FIG. 30 is a diagram illustrating an example computer architecture to execute operations according to embodiments herein.

FIG. 31 is an example diagrams illustrating a method according to embodiments herein.

Figure 1:
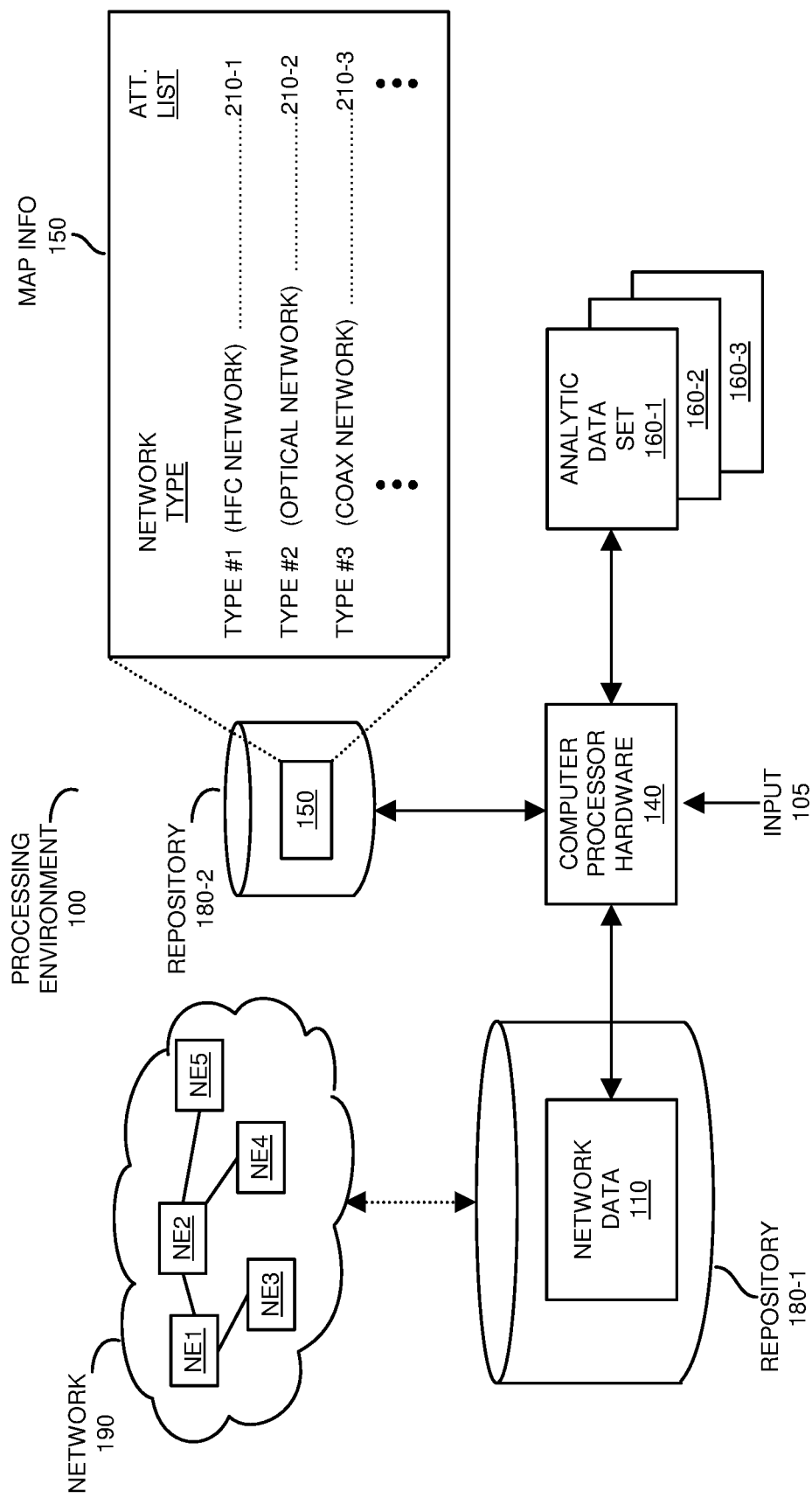
FIG. 1 is an example diagram illustrating computer processor hardware operable to generate analytics data for a respective a network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

As previously discussed, there are deficiencies associated with use of conventional network information such as component names and relationships to define a network. For example, conventional network data describing different attributes of a respective network are often incompatible or are of different types and are, therefore, are not easily analyzed.

In contrast to conventional techniques, embodiments herein include a unique data structure (analytics data set) that provides a novel way of classifying network elements and assigning attributes to the network elements to encode or define a respective network. The data structure (at least partially defined by an attribute list indicating multiple attributes) is well suited for advanced analytics purposes such as deriving additional models to analyze the respective network as specified by the encoded information. Embodiments herein (and corresponding different types of analytics data sets) are useful because they provide more efficient ways of managing and processing large amounts of data defining a respective network and using same to generate useful models. More specifically, the interconnectivity of network components in a structured way as further described herein allows end-to-end systems, and sub-segments of systems, to be analyzed where it was previously impossible due to lack of any formal definition of the physical and logical interrelationships.

Additionally, note that embodiments herein are useful when it is necessary in connecting a network or system's components to other layers of information, whether it is software logical layers, physical component locations, or external factors like weather that can influence the successful operation of an interconnected network, set of system components.

Now, more specifically, FIG. 1 is an example diagram illustrating a processing environment according to embodiments herein.

As shown, processing environment 100 includes computer processor hardware 140 in communication with repository 180-1 and repository 180-2. Repository 180-1 stores network data 110. Network 190 can be any type of network such as an optical network, HFC network, coax network, etc.

In one embodiment, network data 110 stored in repository 180-1 includes data defining network device attributes (such as device name, interconnectivity, device type, device location, etc.) associated with the network elements NE1, NE2, NE3, NE4, etc., disposed in network 190. Network elements can be any suitable type of resource in a network.

In general, during operation, the computer processor hardware 140 generates one or more so-called analytics data sets 160 (network descriptions) based on the network data 110 and respective pertinent data structures available to encode attributes associated with the network 190.

More specifically, in accordance with embodiments herein, assume that the computer processor hardware 140 in FIG. 1 receives input 105 to generate a respective analytics data set 160-1 associated with the network 190.

In one embodiment, the analytics data set 160-1 is a core model defining the network at a desired granularity. For example, the analytics data set 160-1 can be encoded to define a respective network 190 down to the different components (network elements) such as the switches, routers, fiber links, coaxial cables, etc. Alternatively, if desired, the analytics data set 160-1 for network 190 can be generated to define connectivity of different network elements such as network legs or network segments, each of which represents an interconnection of multiple network components.

In this example embodiment, to create analytics data set 160-1 associated with network 190 (which may be an existing network, proposed network for installation, or a combination of both), the computer processor hardware 140 uses the map information 150 to identify a corresponding attribute list indicating attributes (a specific data structure) that are to be used to generate corresponding encoded information in analytics data set 160-1 that will be used to define the network 190.

Note that different attribute lists 210 (such as attribute list 210-1, 210-2, 210-3, etc.) are available to produce a respective description of different types of possible networks being encoded. Each attribute list is tailored to accommodate description of a respective different type of network to which the attribute list pertains.

For example, when producing a description for an optical network, the corresponding attribute list chosen by the computer processor hardware includes attributes (parameters) pertinent to describing entities in optical networks (type #2); when producing a description for a coaxial cable network, the corresponding attribute list chosen by the computer processor hardware includes attributes pertinent to describing entities in a coaxial cable network (type #3); when producing a description for an HFC (Hybrid Fiber Coax) network, the corresponding attribute list chosen by the computer processor hardware includes attributes pertinent to describing entities in an HFC network (type #1); and so on.

Assume in this example that the input 105 received by the computer processor hardware 140 indicates to generate an analytics data set 160-1 associated with network 190. Assume further that the computer processor hardware 140 detects that the network 190 is an optical network being defined by the computer processor hardware 140. In such an instance, the computer processor hardware 140 uses the map information 150 to identify a corresponding attribute list (which defines a data set or structure) that is to be used to generate the analytics data set 160-1.

Via use of map information 150, the computer processor hardware 140 identifies that attribute list 210-2 is to be used to generate the analytics data set 160 because the network 190 as an optical network and the input 105 indicates to generate the general network analytics data set for network 190.

Details of the attribute list 210-2 are further shown in FIG. 2. As its name suggests, the attribute list 210-2 indicates the attributes that are to be encoded for each network element in network 190. In this example embodiment, the attribute list 210-2 in FIG. 2 includes an attribute for: unique identifier value, entity name, entity type, entity location/hide, entity connectivity, etc.

As previously discussed, note again that the different attributes in a respective attribute list (which corresponds to a chosen type of network to encode) can include or indicate any suitable parameters depending on the type of network being defined by an analytics data set. For example, the attributes for describing a particular type of network can include one or more of the following: i) an identifier attribute indicating a unique identifier value assigned to each network element, ii) one or more connectivity attributes indicating connectivity of a particular network element with respect to other network elements in the network, iii) one or more location attributes indicating a geographical location of the network element or geographical region in which the respective network element resides, iv) one or more type attributes indicating a type associated with the network element, v) one or more attributes indicating a number of consumer passings and/or subscribers served by or potentially served by the respective the network element, vi) costs associated with maintenance authentication option installation of the respective network element, etc.

Accordingly, each type of network as indicated by map information 150 has a defined attribute list pertinent to that given network type. For the given network type, as further discussed below, settings of data fields of a respective analytics data set further defines attributes of the corresponding specific network.

FIG. 3 is an example diagram illustrating a more detailed attribute list according to embodiments herein.

In this example embodiment, the example attribute list 210-2 indicates, more specifically, each of multiple attributes that are to be encoded to define each respective network element in the network 190.

For example, the attribute list 210-2 in FIG. 3 includes an N_UUID_NM attribute (in row 3) indicating a universally unique identifier assigned to the respective network element; the attribute list 210-2 includes an attribute N_UUID_TYPE_NM (row 4) indicating a type associated with a respective network segment or device; the attribute list 210-2 includes an attribute N_DWNSTRM_YN_FLAG (row 5) indicating whether the current network device is connected to a downstream network element; the attribute list 210-2 includes an attribute N_UPSTRM_UUID_NM (row 6) indicating the name of a respective upstream network element to which the current network device is connected; the attribute list 210-2 includes an attribute N_LOC_CODE (row 7) indicating a ZIP Code or other general location of the corresponding network element to which the attribute pertains; the attribute list 210-2 includes an attribute N_V1_LAT (row 8) indicating a latitude of a specific location associated with the corresponding network element; the attribute list 210-2 includes an attribute N_V1_LON (row 9) indicating a longitude of a specific location associated with the corresponding network element; the attribute list 210-2 includes an attribute N_V1_ALT (row 10) associated with an altitude associated with the corresponding network element resides; etc.

The latitude—longitude attributes can be used to define a specific location of a network environment to which the data pertains.

In certain instances, as previously discussed, the network element might be a network segment that spans a region or resides in a region. In such an instance, the attributes in attribute list 210-2 include multiple latitude and longitude locations (vertices V1, V2, V3, V4, V5) in which to potentially define corners, coordinates, etc., (any number of points defining boundaries) of the respective geographical region of the network element.

As previously discussed, in one embodiment, the network elements are network segments. In such an instance, the encoded information in respective data fields (such as in columns A, C, and D as further discussed below) of the analytics data set 160-1 indicates connectivity of the network segments with respect to each other.

FIG. 4 is an example diagram illustrating generation of an analytics data set according to embodiments herein.

In this example embodiment, the row #2 in the analytics data set 160-1 indicates the different columns of attributes (column A is assigned attribute N_UUID_NM, column B is assigned attribute N_UUID_NM_TYPE_NM, column C is assigned attribute N_DNSTRM_TN_FLAG, etc.) associated with the network elements that make up the respective network 190 for which an analytics data set 160-1 is being created. Note that the row #1 in analytics data set 160-1 of FIG. 4 corresponds to the attributes in the "Genome ADS Column" of FIG. 3.

As previously discussed in FIG. 1, the computer processor hardware 140 utilizes the network data 110 to determine how to populate the rows and columns of data fields in the analytics data set 160-1. Each row represents a corresponding set of encoded information indicating settings for the attributes associated with the network element to which the row pertains.

Further in this example, column A of row #2 of analytics data set 160-1 (as derived from row 3 attribute list 210-2) includes a data field in which to assign an attribute N_UUID_NM (representing a unique identifier value) to each network element. In this example embodiment, data field in row #3 of column A indicates a respective unique identifier value (P1XXX) assigned to a first network element; data field in row #4 of column A indicates a respective unique identifier value (P2XXX) assigned to a second network element; data field in row #5 of column A indicates a respective unique identifier value (P3XXX) assigned to a third network element; data field in row #6 of column A indicates a respective unique identifier value (P4XXX) assigned to a fourth network element; and so on. In this manner, each network element in the network 190 is assigned a unique name.

Column B of row #2 of analytics data set 160-1 (as derived from row 4 attribute list 210-2) includes a data field in which to assign an attribute N_UUID_TYPE_NM (representing a type identifier) to each network element. Accordingly, in this example embodiment, the data field in row #3 of column B indicates a respective type (PDC) assigned to the first network element (P1XXX); the data field in row #4 of column B indicates a respective type (PDC) assigned to the second network element (P2XXX); the data field row #5 of column B indicates a respective type (PDC) assigned to the third network element (P3XXX); the data field row #6 of column B indicates a respective type (PDC) assigned to the fourth network element (P2XXX); and so on. In this manner, each network element in the network 190 is assigned a type.

Column C of row #2 of analytics data set 160-1 (as derived from row 5 attribute list 210-2) further includes a data field in which to assign an attribute N_DWNSTRM_YN_FLAG (representing a flag identifier) to each network element. The flag identifier indicates whether the corresponding network element is connected to a downstream network element. Accordingly, in this example embodiment, the data field in row #3 of column C indicates that there is a downstream network element connected to network element P1XXXX; the data field in row #4 of column C indicates that there is a downstream network element device connected to network device P2XXXX; the data field in row #5 of column C indicates that there is a downstream network element connected to network element P3XXXX; the data field in row #6 of column C indicates that there is a downstream network element connected to network device P4XXXX; and so on. In this manner, the analytics data set 160-1 indicates whether a respective network element is connected to a downstream device.

Column D of row #2 of analytics data set 160-1 (as derived from row 6 of attribute list 210-2) further includes a data field in which to assign an attribute N_UPSTRM_UUID_NM representing a name of an upstream network element to which the current network element (as specified in column A) is connected. Accordingly, in this example embodiment, the data field in row #3 of column D indicates that the network element P1XXXX is connected to upstream network element HE001 (headend or root node); the data field in row #4 of column D indicates that the network element P2XXXX is connected to upstream network element HE001 (headend); the data field in row #5 of column D indicates that the network element P3XXXX is connected to upstream network element HE001 (headend); the data field in row #6 of column D indicates that the network element P4XXXX is connected to upstream network element HE001 (headend); and so on.

Column E of row #2 of analytics data set 160-1 (as derived from attribute list 210-2) further includes a data field in which to assign an attribute N_LOC_CODE representing a location name of a respective network element. Accordingly, in this example embodiment, the data field in row #3 of column E indicates that the network element P1XXXX is located in zip code 63131; the data field in row #4 of column E indicates that the network element P2XXXX is located in zip code 63131; the data field in row #5 of column E indicates that the network element P3XXXX is located in zip code 63131; and so on.

As further shown, columns F, G, and H include respective data fields to identify a respective specific location and altitude associated with a network element. In this example, network element P1XXXX resides at latitude 38.726098, longitude −90.407903, and altitude of 624 feet above sea level; network element P2XXXX resides at latitude 38.726098, longitude −90.407903, and altitude of 622 feet above sea level; and so on.

Figure 5:
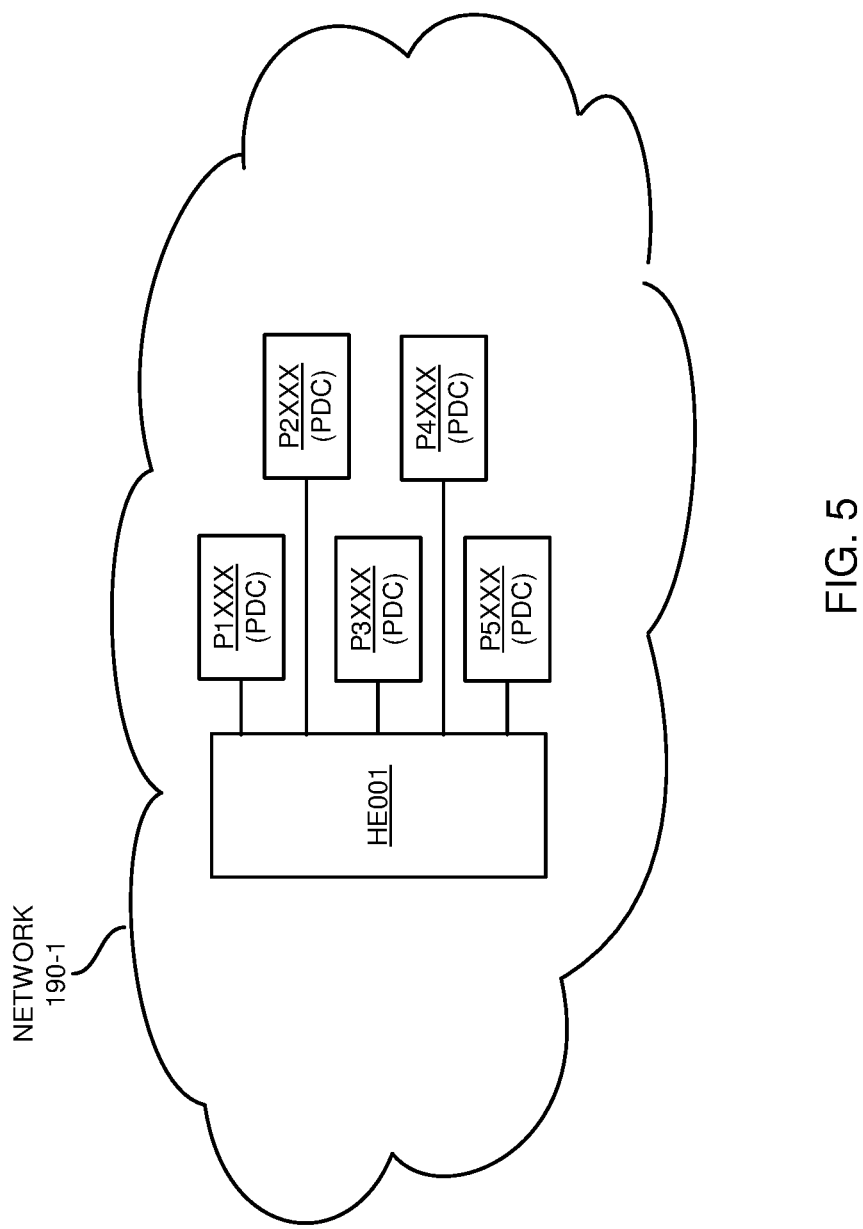
FIG. 5 is an example diagram illustrating a relationship of network elements derived from the encoded information in FIG. 4 according to embodiments herein.

FIG. 5 is an example diagram illustrating a graphical representation of the network is derived from an analytics data set according to embodiments herein.

As previously discussed, the computer processor hardware 140 produces the analytics data set 160-1 (encoded information) based upon network data 110 associated with the network elements in network 190. As shown, network 190-1 in FIG. 5 illustrates connectivity and device names as specified by the encoded information in data fields of analytics data set 160-1 as shown in FIG. 4.

Figure 6:
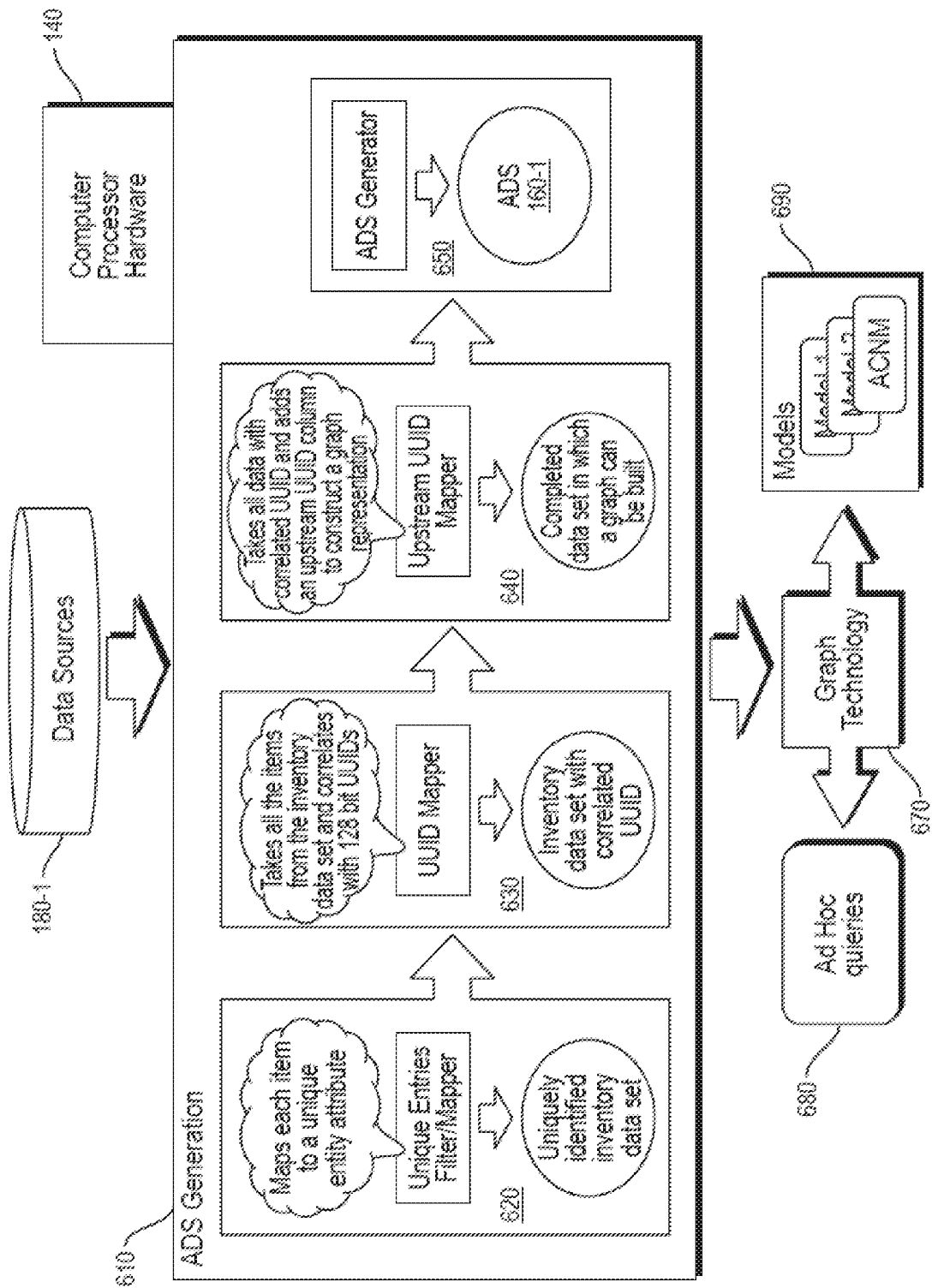
FIG. 6 is an example diagram illustrating generation of and use of one or more analytics data sets to further generate one or more different types of network models for analysis according to embodiments herein.

FIG. 6 is an example diagram illustrating general operations of generating an analytics data set and corresponding uses of the generated analytics data set according to embodiments herein.

As shown, the computer processor hardware 140 has access to data sources (data stored in repository 180-1). Via the data from data sources, the computer processor hardware identifies items in a respective network being defined.

In operation 620, the computer processor hardware 140 implements a mapper to map each item (element) to a unique entity attribute to produce a uniquely identified inventory data set.

In operation 630, the computer processor hardware 140 takes all the items from the generated inventory data set and correlates each of them with a respective unique identifier value (such as 128 bit UUID).

In operation 640, via an upstream UUID mapper, the computer processor hardware 140 takes all data with correlated UID values and adds an upstream UID column to construct a graph representation. The upstream UUID mapper produces a completed data sets in which a graph can be built.

In operation 650, the computer processor hardware implements ADS generator to generate a respective analytics data set 160-1.

Subsequent to generating the description (the encoded information or analytics data set) for a network of a particular type, the analytics data set can be used for any suitable purpose.

One embodiment herein includes using graph technology 670 and a respective generated analytics data set to produce one or more additional models 690 of interest or satisfy ad hoc queries 680 with respect to a respective network encoded by a corresponding analytics data set such as analytics data set 160-1.

Figure 7:
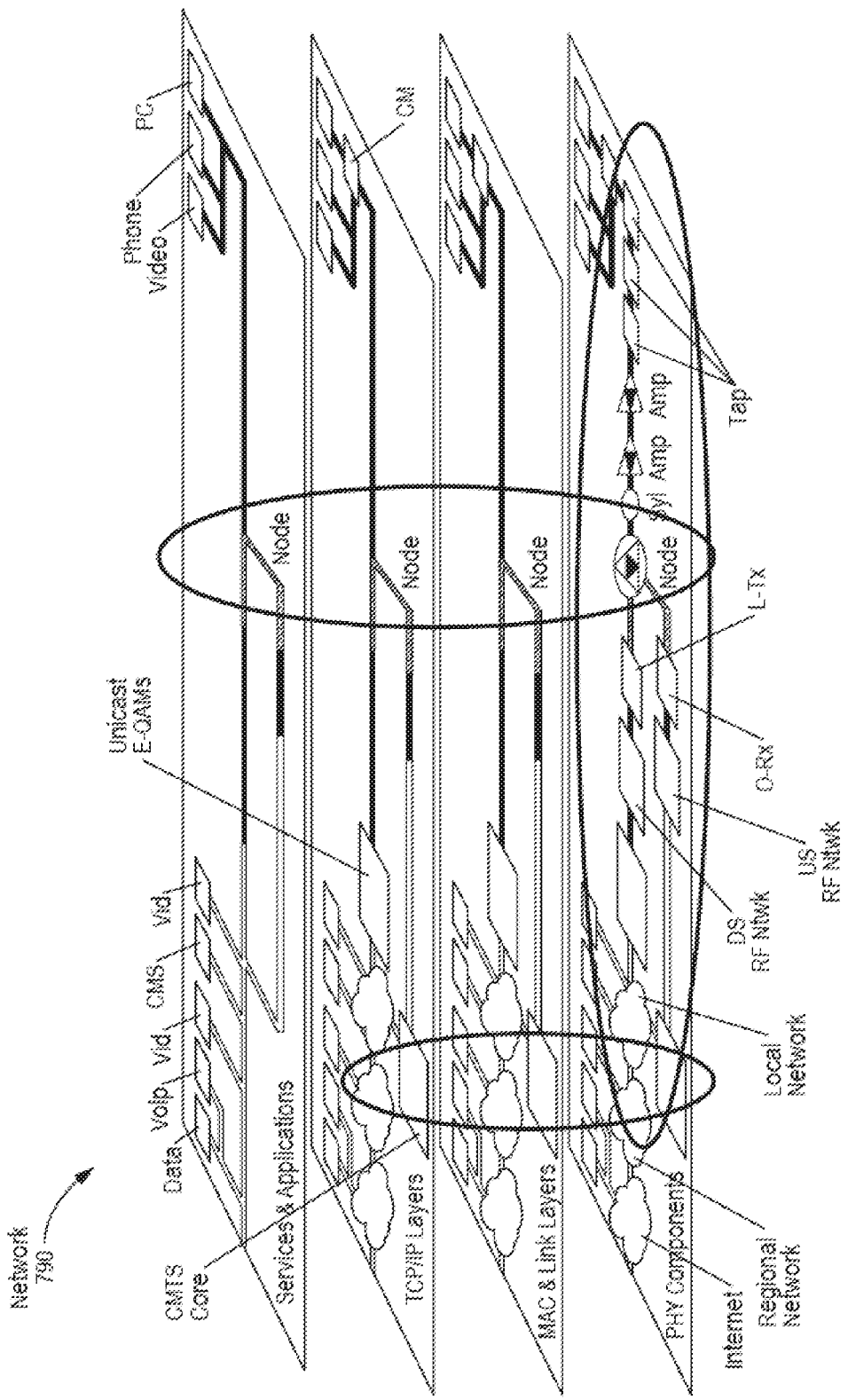
FIG. 7 is an example diagram illustrating that an analytics data set can be used to describe attributes of a network at any of one or more layers according to embodiments herein.

FIG. 7 is an example diagram illustrating attributes of a network according to embodiments herein.

As shown, the network 2490 includes multiple layers including a physical layer, MAC address and link layer, transport layer, and applications layer.

As previously discussed, embodiments herein can include generating a respective analytics data set to describe attributes of a network at a physical layer. However, note that further embodiments herein can include modifying an attribute list to include supplemental data fields to indicate further attributes of a network (such as network address information, executed applications, ports, sockets, etc.) at the different network layers. As previously discussed, the attributes can be used to define specific details of the network (or subsets of the network that are of specific interest) at any desired degree of granularity.

FIGS. 8-10 are example diagrams illustrating encoded information for analyzing a network according to embodiments herein.

In this example embodiment, the attribute list used to generate analytics data set 810 (combination of analytics data set portion 810-1 in FIG. 8, analytics data set portion 810-2 in FIG. 9, and analytics data set portion 810-3 in FIG. 10). Columns A-K in FIG. 8 define the baseline analytics data set of the network being defined.

Similar to the analytics data set 160-1 in FIG. 4, the analytics data set 810 (of FIGS. 8-10) includes additional attributes to extend the genome network defined by respective attributes in first columns A through K. That is, the analytics data set 810 includes additional attribute columns L through V defining additional attributes and extending the baseline analytics data set into a more detailed, expanded analytics data set.

As shown, column L is assigned attribute N_COAX_DIST_MI indicating a total coaxial cable distance associated with the corresponding network element identified in column A; column M is assigned attribute N_FIBER_DIST_MI indicating a total distance of fiber associated with the corresponding network element identified in column A; column N is assigned attribute N_CONST_DIST_MI indicating a total distance of construction associated with the corresponding network element identified in column A; column O is assigned attribute N_AERIAL_OL_PCT indicating a total percentage of the network element that is disposed at an aerial location for the corresponding network element identified in column A; column P is assigned attribute N_AERIAL_NEW_PCT indicating a total percentage of the network element that is new at an aerial location for the corresponding network element identified in column A; column Q is assigned attribute N_AERIAL_REM_PCT indicating a total remake percentage associated with the given network element identified in column A; column R is assigned attribute N_UG_JTRENCH_PCT indicating a total joint underground trench percent; column S is assigned attribute N_UG_PTRENCH_PCT indicating a total plowed trench percentage associated with the given network element identified in column A; column T is assigned attribute N_UG_DBORE_PCT indicating a total underground direct bore percentage associated with the given network element identified in column A; column U is assigned attribute N_UG_VDUCT_PCT indicating a total underground vacant duct associated with the given network element identified in column A; column U is assigned attribute N_CED_PCT indicating a core extraction percentage associated with the given network element identified in column A.

Accordingly, the extra rows of attributes L through V and corresponding data fields provide supplemental details associated with the baseline genome network described by encoded information in columns A through K.

Note that the overall encoded information in the analytics data set 810 (combined data set portions 810-1, 810-2, and 810-3) can be presented in any suitable manner. In one embodiment, the spreadsheet itself is useful to identify different information associated with a respective genome network. As previously discussed, the spreadsheet of data fields in analytics data set 810 is easily processes by computer processor hardware. Alternatively, as previously discussed, embodiments herein can include applying graph technology 670 to the generated analytics data set 810 to produce visualizations of a corresponding one or more models associated with or derived from the analytics data set 810.

Figure 11:
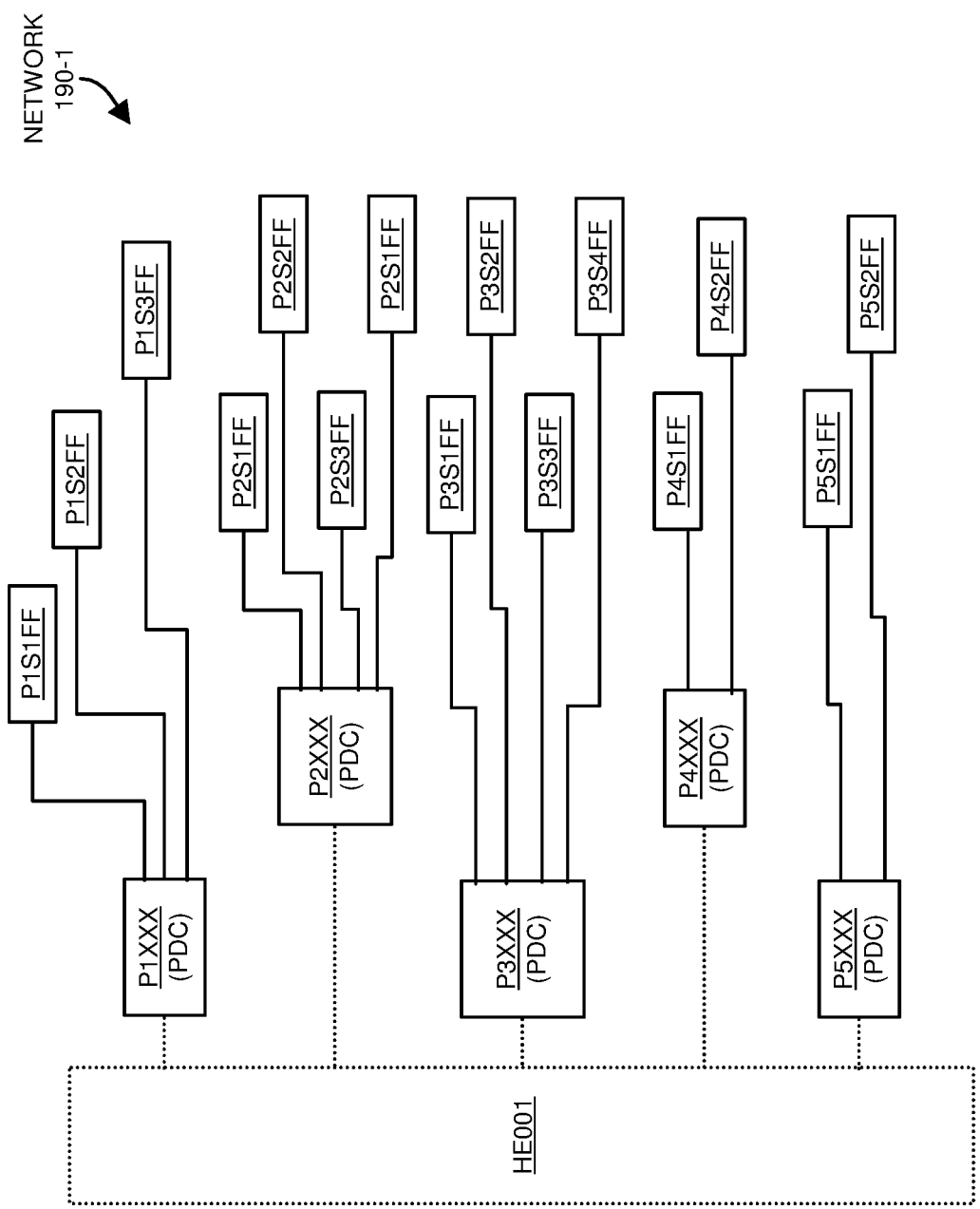
FIG. 11 is an example diagram illustrating a relationship of network elements derived from the encoded information in FIGS. 8-10 according to embodiments herein.

FIG. 11 is an example diagram illustrating a relationship of network elements derived from the encoded information in FIGS. 8-10 according to embodiments herein.

As shown in FIG. 11, in accordance with columns A through D in analytics data set 810, the network elements P1XXX, P2XXX, P3XXX, P4XXX, and P5XXX are upstream nodes.

Network elements P1S1FF, P1S2FF, and P1S3FF are downstream network elements with respect to network element P1XXX.

Network elements P2S1FF, P2S2FF, P2S3FF, and P2S4FF are downstream network elements with respect to network element P2XXX.

Network elements P3S1FF, P3S2FF, P3S3FF, and P3S4FF are downstream network elements with respect to network element P3XXX.

Network elements P4S1FF and P4S2FF are downstream network elements with respect to network element P4XXX.

Network elements P5S1FF and P5S2FF are downstream network elements with respect to network element P5XXX.

As previously discussed, the columns L through V of analytics data set 810 indicate additional attributes associated with each of the network elements identified in column A of analytics data set 810-1 in FIG. 8.

FIG. 12 is an example diagram illustrating encoded information defining a respective network according to embodiments herein.

In this example embodiment, the row #2 in the analytics data set 1260 indicates the different columns of attributes (column A is assigned attribute N_UUID_NM, column B is assigned attribute N_UUID_NM_TYPE_NM, column C is assigned attribute N_DNSTRM_TN_FLAG, etc.) associated with the network elements that make up the respective network 190 for which a analytics data set 1260 is being created.

As previously discussed, the computer processor hardware 140 utilizes corresponding network data to determine how to populate the rows and columns of data fields in the analytics data set 1260. Each row of data fields includes a corresponding set of encoded information indicating settings for the attributes associated with the network element to which the row pertains.

Further in this example, column A of row #2 of analytics data set 1260 (as derived from attribute list 210-2) includes a data field in which to assign an attribute N_UUID_NM (representing a unique identifier value) to each corresponding network element. In this example embodiment, data field in row #3 of column A indicates a respective unique identifier value (P1S1XX) assigned to a first network element; data field in row #4 of column A indicates a respective unique identifier value (P1S2XX) assigned to a second network element; data field in row #5 of column A indicates a respective unique identifier value (P1S3XX) assigned to a third network element; data field in row #6 of column A indicates a respective unique identifier value (P2S1XX) assigned to a fourth network element; and so on.

Column B of row #2 of analytics data set 1260 (as derived from attribute list 210-2) includes a data field in which to assign an attribute N_UUID_TYPE_NM (representing a type identifier) to each corresponding network element. Accordingly, in this example embodiment, the data field in row #3 of column B indicates a respective type (SDC) assigned to the first network element (P1S1XX); the data field in row #4 of column B indicates a respective type (SDC) assigned to the second network element (P1S2XX); the data field row #5 of column B indicates a respective type (SDC) assigned to the third network element (P1S3XX); the data field row #6 of column B indicates a respective type (SDC) assigned to the fourth network element (P213XX); and so on.

Column C of row #2 (as derived from attribute list 210-2) further includes a data field in which to assign an attribute N_DWNSTRM_YN_FLAG (representing a flag identifier) to each respective network element. The flag identifier indicates whether the corresponding network element is connected to a downstream network element. Accordingly, in this example embodiment, the data field in row #3 of column C indicates that there is a downstream network element connected to network element P1S1XX; the data field in row #4 of column C indicates that there is a downstream network element connected to network element P1S2XX; the data field in row #5 of column C indicates that there is a downstream network element connected to network element P1S3XX; the data field in row #6 of column C indicates that there is a downstream network element connected to network element P2S1XX; and so on.

Column D of row #2 (as derived from attribute list 210-2) further includes a data field in which to assign an attribute N_UPSTRM_UUID_NM representing a name of an upstream network element to which the current network element (as specified in column A) is connected. Accordingly, in this example embodiment, the data field in row #3 of column D indicates that the network element P1S1XX is connected to upstream network element P1S1FF; the data field in row #4 of column D indicates that the network element P1S2XX is connected to upstream network element P1S2FF; the data field in row #5 of column D indicates that the network element P1S3XX is connected to upstream network element P1S3FF; the data field in row #6 of column D indicates that the network element P2S1XX is connected to upstream network element P1S3FF; and so on.

Column E of row #2 (as derived from attribute list 210-2) further includes a data field in which to assign an attribute N_LOC_CODE representing a location name of a respective network element. Accordingly, in this example embodiment, the data field in row #3 of column E indicates that the network element P1S1XX is located in zip code 63131; the data field in row #4 of column E indicates that the network element P1S2XX is located in zip code 63131; the data field in row #5 of column E indicates that the network element P2S3XX is located in zip code 63131; and so on.

As further shown, columns F, G, and H include respective data fields to identify a respective specific location and altitude associated with a network element. In this example, network element P1S1XX resides at latitude 38.733095, longitude −90.404642 and altitude of 624 feet above sea level; network element P1S2XX resides at latitude 38.727131, longitude −90.414589, and altitude of 584 feet above sea level; and so on.

FIG. 13 is an example diagram illustrating a graphical representation of the network is derived from an analytics data set in FIG. 12 according to embodiments herein.

As previously discussed, the computer processor hardware 140 produces the analytics data set 1260 based upon network data 110 associated with respective network elements. As shown, network 1290 illustrates connectivity and element names as specified by the encoded information in data fields of analytics data set 1260 as shown in FIG. 13.

FIGS. 14-18 are a example diagrams illustrating encoded information defining a respective network according to embodiments herein. Analytics data set 1460 is described by a combination of FIGS. 14-18.

For example, FIG. 14 includes a first analytics data set portion 1460-1 of analytics data set 1460; FIG. 15 includes second analytics data set portion 1460-2; FIG. 16 includes third analytics data set portion 1460-3; FIG. 17 includes fourth analytics data set portion 1406-4; FIG. 18 includes second analytics data set portion 1460-5.

In a similar manner as previously discussed, the first analytics data set portion 1460-1 and the second analytics data set portion 1460-2 define the names of the different network elements as well as corresponding connectivity and location information. FIG. 19 is an example diagram illustrating connectivity derived from columns A through Q in the analytics data set 1460.

Referring again to FIGS. 14-18, in addition to encoded information in columns A through Q (in FIGS. 14-16)

describing attributes of a respective network, the analytics data set 1460 (at FIGS. 17 and 18) includes columns of attributes AA through AS SHOWN, of which columns R though AE are similar to attributes in columns previously discussed in analytics data set 860 (FIGS. 8-10).

Columns AF through AS in this example analytics data set 1460 include further attributes associated with a respective network being defined. For example, data fields in column AF of analytics data set 1460-4 indicate a corresponding number of high rise (buildings) a respective network element (such as a network segment) identified in column A of the analytics data set 1460 passes (note that occupants in the high-rise buildings can easily be connected to the network segment); data fields in column AG of analytics data set AG indicate a corresponding number of campus (buildings) a respective network segment identified in column A of the analytics data set 1460 passes; data fields in column AH of analytics data set 1460-4 indicate a corresponding number of residential (buildings) a respective network segment identified in column A of the analytics data set 1460 passes (occupants in the residential buildings can easily be connected to the network segment); data fields in column AI of analytics data set 1460-5 indicate a corresponding number of enterprises a respective network segment identified in column A of the analytics data set 1460 passes; data fields in column AJ indicate a corresponding number of SMB (environments) a respective network segment identified in column A of the analytics data set 1460 passes; data fields in column AK indicate a corresponding conversion percentage associated with actual subscribers to the number of residential passings; etc.

Additional columns AO through AQ indicate spending information associated with different passings for each network segment. In such an instance, passings information in the columns AF through AJ is used at least in part to generate the spending information in columns AO to AQ. Column AR indicates the telespend revenue months. Column AS indicates the percentage of telespend-based operating costs associated with each respective network segment in the network.

Accordingly, the general analytics data set such as in columns A through Q can be expanded to include additional descriptive information such as in columns S through AS associated with each network element (network segment) of the network.

FIG. 19 is an example diagram illustrating connectivity of the element in the network as defined by the analytics data set 1460. As previously discussed, the general analytics data set such as in columns A through Q can be expanded to include additional descriptive ADS information such as columns S through AS associated with each network element (network segment) of the network.

FIGS. 20-21 are example diagrams illustrating encoded information defining a respective network a according to embodiments herein.

In this example embodiment, the row #2 in the analytics data set 2060-1 (of analytics data set 2060) indicates the different columns of attributes (column A is assigned attribute N_UUID_NM, column B is assigned attribute N_UUID_NM_TYPE_NM, column C is assigned attribute N_DNSTRM_YN_FLAG, etc.) associated with the network elements that make up the respective network for which analytics data set 2060 is being created.

Further in this example, column A of row #2 of analytics data set 2060-1 (as derived from attribute list 210-2) includes a data field in which to assign an attribute N_UUID_NM (representing a unique identifier value) to each network element. In this example embodiment, data field in row #3 of column A indicates a respective unique identifier value (P1XXXX) assigned to a first network element; data field in row #4 of column A indicates a respective unique identifier value (P1S1FF) assigned to a second network element; data field in row #5 of column A indicates a respective unique identifier value (P1S1XX) assigned to a third network element; data field in row #6 of column A indicates a respective unique identifier value (P1S2FF) assigned to a fourth network element; and so on.

Column B of row #2 of analytics data set 2060-1 (as derived from attribute list 210-2) includes a data field in which to assign an attribute N_UUID_TYPE_NM (representing a type identifier) to each network element. Accordingly, in this example embodiment, the data field in row #3 of column B indicates a respective type (PDC) assigned to the first network element (P1XXXX); the data field in row #4 of column B indicates a respective type (FEEDF) assigned to the second network element (P1S1FF); the data field row #5 of column B indicates a respective type (SDC) assigned to the third network element (P1S1XX); the data field row #6 of column B indicates a respective type (FEEDF) assigned to the fourth network element (P1S2FF); and so on.

Column C of row #2 (as derived from attribute list 210-2) further includes a data field in which to assign an attribute N_DWNSTRM_YN_FLAG (representing a flag identifier) to each network element. The flag identifier indicates whether the corresponding network device is connected to a downstream network device. Accordingly, in this example embodiment, the data field in row #3 of column C indicates that there is a downstream network device connected to network device P1XXXX; the data field in row #4 of column C indicates that there is a downstream network device connected to network device P1S1FF; and so on.

Column D of row #2 (as derived from attribute list 210-2) further includes a data field in which to assign an attribute N_UPSTRM_UUID_NM representing a name of an upstream network element to which the current network element (as specified in column A) is connected. Accordingly, in this example embodiment, the data field in row #3 of column D indicates that the network device P1XXXX is connected to upstream network device HE001; the data field in row #4 of column D indicates that the network device P1S1FF is connected to upstream network device P1XXXX; and so on.

Column E of row #2 (as derived from attribute list 210-2) further includes a data field in which to assign an attribute N_LOC_CODE representing a location name of a respective network device. Accordingly, in this example embodiment, the data field in row #3 of column E indicates that the network device P1XXXX is located in zip code 63131; the data field in row #4 of column E indicates that the network device P1S1FF is located in zip code 63131; and so on.

As further shown, columns F, G, and H include respective data fields to identify a respective specific location of a first vertex and altitude associated with a network element; columns I, J, and K include respective data fields to identify a respective specific location of a second vertex and altitude associated with a network element; columns L, M, and N include respective data fields to identify a respective specific location of a third vertex and altitude associated with a network element; columns O, P, and Q include respective data fields to identify a respective specific location of a fourth vertex and altitude associated with a network element.

As shown, and as previously discussed, any number of vertices as indicated by the analytics data set 2060 can be used to identify the region or location in which the corresponding network element specified by data in respective column A. Accordingly, the analytics data set 2060 includes data indicating settings for each of the network elements.

Figure 22:
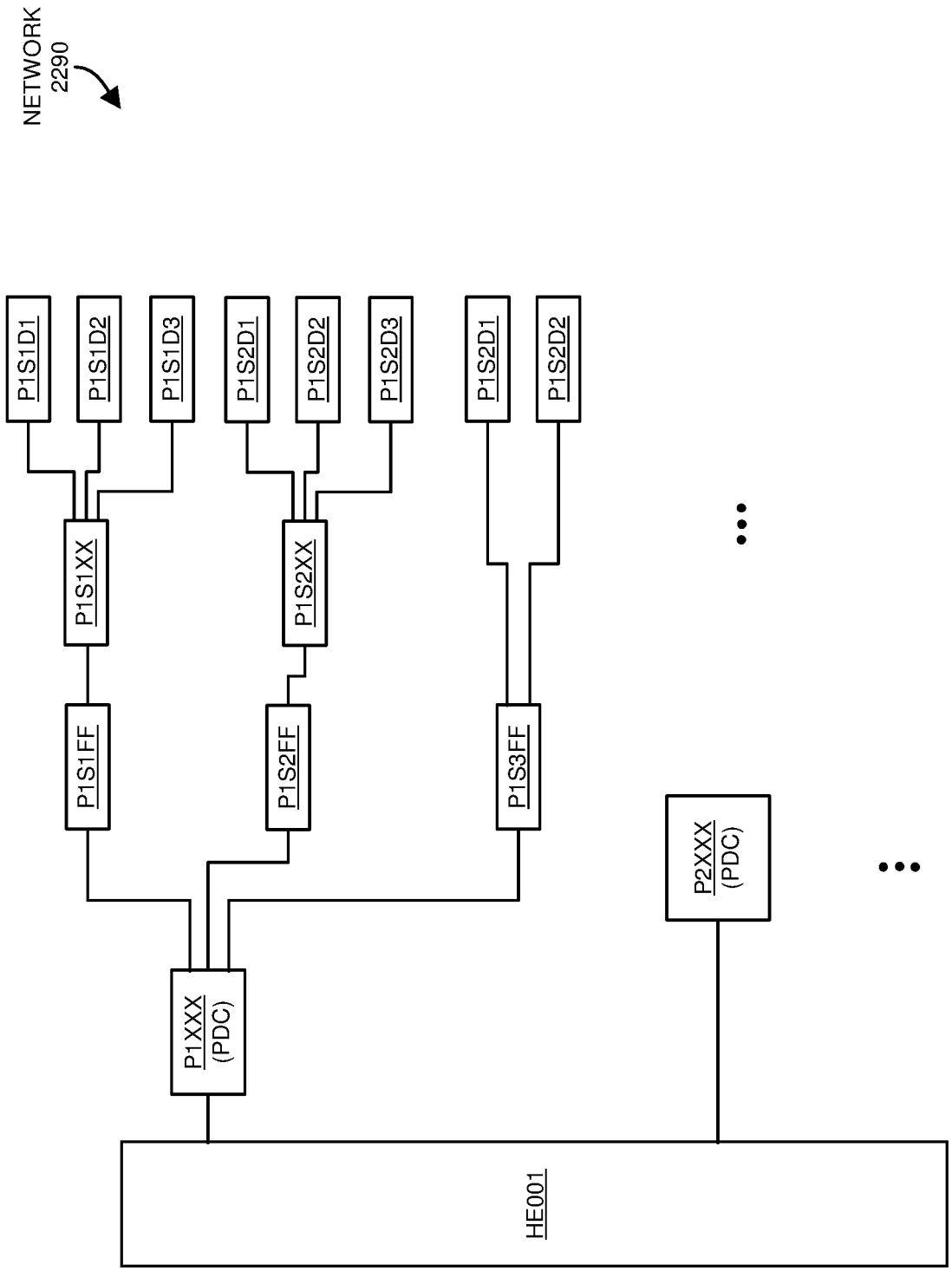
FIG. 22 is an example diagram illustrating a relationship of network elements derived from the encoded information in FIGS. 20-21 according to embodiments herein.

FIG. 22 is an example diagram illustrating a relationship of network elements derived from the analytics data set in FIGS. 20-21 according to embodiments herein.

As previously discussed, the computer processor hardware 140 produces the analytics data set 2060 based upon network data 110 associated with the network elements of a network. As shown, network 2290 illustrates connectivity and device names as specified by the encoded information in data fields of analytics data set 2060 (combination of 2060-1 and 2060-2) as shown in FIGS. 20-21.

FIG. 23 is an example diagram illustrating an analytics data set including supplemental cost data associated with components potentially found in a respective network according to embodiments herein.

In this example, the analytics data set 2350 (component and respective component cost information) indicates cost information associated with each of multiple different types of network elements that may be present in a corresponding type of network. For example, a network element (component) such as a EPON_HEND_HE_CARD costs $9,300; network element such as a EPON_HEND_HE_OPTIC costs $250; network element such as a EPON_HEND_OLT_CHASSIS costs $2,762.70; and so on.

FIGS. 24A and 24B are example diagrams illustrating a first portion of an analytics data set indicating connectivity of network components according to embodiments herein.

In a manner as previously discussed, the information in respective data fields of the analytics data set 2460-1 indicates names of network elements, connectivity, location information, etc., of the different network elements.

FIGS. 25A and 25B are example diagrams illustrating a cost coefficient matrix according to embodiments herein.

As shown, columns DL through EG (such as a cost coefficient matrix including integer values) of analytics data set 2460-2 of FIG. 25 correspond to cost information in analytics data set 2350 of FIG. 23.

For example, column DL of the analytics data set 2460-2 includes respective data fields indicating whether a corresponding type of network element EPON_HEND_HE_CARD pertains to the network element as indicated by the row. More specifically, column DL corresponds to a network element EPON_HEND_HE_CARD that costs $9,300 (see row 2, column B as indicated in the analytics data set 2350). The value in the data field (row 10 in column DL for EPON_HEND_HE_CARD_COUNT of analytics data set 2460-2 of FIG. 25) indicates whether or not one or more of the corresponding type of network element EPON_HEND_HE_CARD is included in the corresponding network segment P1XXXX as indicated by row 10 of 2460-1. In this example, the data field (row 10 in column DL of analytics data set 2460-2 of FIG. 25 is populated with a value of 1 indicating that there is one EPON_HEND_HE_CARD component in the corresponding network element E.P1XXX assigned unique identifier value of P1XXX. Row 10, column FC in the analytics data set 2460-3 (FIG. 26) reflects this cost at $9,300.

Column DO of the analytics data set 2460-2 includes respective data fields indicating whether a corresponding type of network element EPON_HEND_OLT_CARD pertains to the network element as indicated by the row. More specifically, column DO corresponds to a network element EPON_HEND_OLT_CARD that costs $905 (see row 5, column B as indicated in the analytics data set 2350). The value in the data field (row 10 in column DO for EPON_HEND_OLT_CARD_COUNT of analytics data set 2460-2 of FIG. 25) indicates whether or not one or more of the corresponding type of network element EPON_HEND_OLT_CARD is included in the corresponding network segment P1XXXX as indicated by row 10 of 2460-1. In this example, the data field (row 10 in column DO of analytics data set 2460-2 of FIG. 25 is populated with a value of 2 indicating that there are two EPON_HEND_OLT_CARD components in the corresponding network element E.P1XXX assigned unique identifier value of P1XXX. Row 10, column FFC in the analytics data set 2460-3 (FIG. 26) reflects this cost of two components at a total of $1,810.

In this manner, the coefficient matrix of FIG. 25 indicates sub-elements that reside in a respective network segment. Application of the coefficient matrix in analytics data set 2460-2 to the component cost information in analytics data set 2350 yields cost information in analytics data set 2460-2.

FIGS. 27A and 27B are example diagrams illustrating an analytics data set 2460-4 and corresponding coefficient matrix associated with components and component count calculation overrides according to embodiments herein.

FIGS. 28A and 28B are example diagrams illustrating an analytics data set 2460-5 including additional details associated with each of the network segments according to embodiments herein. Note that, in addition to defining different attributes of a network such as connectivity, component cost information, etc., embodiments herein can include providing financial information indicating attributes such as revenue, operating costs, installation costs, etc. associated with each of the network segments.

FIGS. 29A and 29B are example diagrams illustrating an analytics data set indicating business data associated with each of the network segments according to embodiments herein.

Via computer processor hardware, the information in analytics data set 2460 as previously discussed can be further compiled and processed to produce a summary of information as shown in columns JI through JY.

FIG. 30 is an example block diagram of a computer system for implementing any of the operations as discussed herein according to embodiments herein.

Any of the resources as discussed herein can be configured to include a processor and executable instructions to carry out the different operations as discussed herein.

As shown, computer system 2450 (such as a respective server resource) of the present example can include an interconnect 2411 that couples computer readable storage media 2412 such as a non-transitory type of media (i.e., any type of hardware storage medium) in which digital information can be stored and retrieved, a processor 2413, I/O interface 2414, and a communications interface 2417.

I/O interface 2414 supports connectivity to repository 180 and input resource 1092.

Computer readable storage medium 2412 can be any hardware storage device such as memory, optical storage, hard drive, floppy disk, etc. In one embodiment, the computer readable storage medium 2412 stores instructions and/or data.

As shown, computer readable storage media 2412 can be encoded with application 140-1 (e.g., including instructions) to carry out any of the operations as discussed herein.

During operation of one embodiment, processor 2413 accesses computer readable storage media 2412 via the use of interconnect 2411 in order to launch, run, execute, interpret or otherwise perform the instructions in application 140-1 stored on computer readable storage medium 2412. Execution of the application 140-1 produces process 140-2 to carry out any of the operations and/or processes as discussed herein.

Those skilled in the art will understand that the computer system 2450 can include other processes and/or software and hardware components, such as an operating system that controls allocation and use of hardware resources to application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 2450 may reside at any location or can be included in any suitable resource in any network environment to implement functionality as discussed herein.

Functionality supported by the different resources will now be discussed via flowcharts in FIG. 31. Note that the steps in the flowcharts below can be executed in any suitable order.

FIG. 31 is a flowchart 3100 illustrating an example method according to embodiments herein. Note that the flowchart 3100 overlaps with respect to concepts as discussed above.

In processing operation 3110, the computer processor hardware 140 retrieves network data 160 associated with a set of elements (such as network elements NE1, NE2, NE3, . . . ) in a network 190.

In processing operation 3120, the computer processor hardware 140 assigns a unique identifier value to each respective element in the network 190 of interest.

In processing operation 3130, the computer processor hardware 140 receives/retrieves an attribute list 210-2 indicating different attributes pertinent to the set of elements and a type of network being defined.

In processing operation 3140, for each unique identifier value and corresponding network element in the network 190, the computer processor hardware 140 utilizes the received network data 160 to produce a corresponding set of encoded information (analytics data set) indicating settings for the attributes in the list. The encoded information defines the network 190 for subsequent analysis and possible further modeling.

Further Embodiments

As previously discussed, embodiments herein include a proposed system of universal alias and universal dependency for application to access network systems and infrastructure.

Experimental Creation of Universal Alias and Dependency

The absence of a consistent inventory and general absence of structural relationship data (such as interdependent operational costs, connectivity relationships between and among structural components, interrelationship of process dependencies, combined operational efficiency requirements to maximize service levels, etc.) led to a desire that the company develop and deploy a universal alias system for element identification, and a universal dependency system for element relationships. The author has previous experience with development and operation of these two structures (in a small satellite telecommunications firm in the 1980s—the author was architect of the network operations infrastructure). During 2015 when Charter was evaluating Fiber to the Premise (FTTP) construction opportunities for the first time, the test design output was manually processed by the author to create a trivial universal alias assignment (that is, naming each key element in the test design network) and universal dependency relationship (that is, manually assigning to each element in the test design network an "upstream" or parent device reflective of its position in a hierarchy). The data generated from this exercise was used to demonstrate key Analytics processes including mechanized assessment of "what if" scenarios using optimization methods.

A Proposal for Universal Alias

Universal alias would take the form of a single, global, inventory repository, binding to each named device (or software service component) a Universally Unique Identifier (UUID). UUID is commonly a 128-bit identifier considered unique within the domain of operation and the proposal reflects this definition. A number of algorithms exist and UUID is an established mechanism for such purposes. The UUID would be established for each existing named (and in many cases, currently unnamed) device or component, so that at the outset, each network element or component would be known by its UUID, with an alias being the common or legacy name of the device. In this sense, the UUID is the "root" or core name, and the legacy name(s) is/are aliases. No existing names are discarded or changed (potential duplication is readily handled by the fact that UUIDs are by definition unique.) The data record (or row) containing the UUID and alias(es) would be augmented or enriched by, or linked to, (using UUID as the common associative identity) detail information such as geolocation (latitude, longitude, altitude/elevation), configuration, operational indices, economic measures, and for each of these augmented data elements, a granular Julian time stamp with at least millisecond resolution. It is likely that the number of enrichment data elements associated with each UUID would number at least in the thousands, given low cost for computing, communications and storage, and the benefits that accrue from having detail historic data readily accessible.

A Proposal for Universal Dependency

Universal dependency is based fundamentally on the concept that for each device or system, there is a parent, senior, or northbound element or system on which the device directly depends. For example, in an HFC network, at a relatively coarse level of granularity, a node is directly dependent on the hub/headend optical transmitter/receiver, which in turn is dependent on headend signal generation equipment (Cable Modem Termination System ports, video edge devices, and the like), which themselves are dependent on service providing infrastructure such as video servers, web servers, provisioning systems, and the like. This parent, senior or northbound element or system relationship is called "upline" (avoiding the term "upstream" which has a specific connotation in a frequency division multiplexed network such as HFC.)

For each UUID in the repository of universal alias, an upline UUID is stored. In its simplest form, the universal alias record need only have an upline UUID; records without an upline UUID are either root records within the domain they describe (such as a web server which has no explicit parent dependency), or such records (lacking upline) are orphans and do not participate in analysis based on dependency.

The reader may observe references in this section to "an upline". In fact, a single upline reference is necessary to establish dependency, however, there are two cases where a given entity (UUID record) can find more than one upline reference.

The first case for multiple upline references (which is expected to be ubiquitous) is where a given entity (UUID record) is associated with any number of upline references that reflect indirect dependencies. For example, although a set-top box is most directly dependent on the wall outlet into which it is jumpered (which in turn is dependent on the house splitter or integrated splitter-amplifier, which in turn is dependent on the drop, then the tap, then an amplifier, then a node, and so on), the set-top box is also indirectly dependent on various service platforms, for linear video, on-demand video, streaming video, conditional access system (CAS) or digital rights management (DRM), emergency alert system (EAS), and so on.

The second case for multiple upline references (which is expected to be less common, but nonetheless important), is where a given entity (UUID record) is associated with more than one direct upline reference. An example of this is diverse routing or ring structures present in the provider network. Another example of this is equipment or software service with in-built redundancy. In these cases, the entity's direct upline is a multi-reference structure, which internally manages the existence and behavior of multiple upline paths and the convergence points associated with these paths or devices.) The "multi-reference" structure is implemented with a virtual UUID record (which itself is not a physical piece of equipment or software system, but rather a container for the physical or software elements which together deliver the intended redundancy.) Virtual UUID records are described in the next section of this paper.

Universal Alias and Universal Dependency can be Virtual

Up to this point in this paper, UUID pertains to a physical device or a software component. Such a restriction does not exist—UUID can be created purely for convenience of categorization or identity. A ready example of this identity is the cable operator's billing system notion of "billing address". This establishes a physical location which is in turn a billing identifier. Creating a UUID alias for each house address (specifically, creating a UUID for which an initial alias is the "billing address."

For example, a business organization may wish to associate all set-top boxes in a geographic section of a community. A ready example of this need would be for local advertising insertion, where "zones" (groups of subscribers associated by geography) are a traditional unit of commodity in sales of advertising insertions. Although no single piece of equipment (such as a digital ad splicing system) may be dedicated to such a zone, the zone is nonetheless of significant commercial importance. For this reason, a UUID can be established, and established as the upline entity under which set-top boxes are grouped. The newly created zone UUID would then be associated with each set-top box within the zone. At this point, by inspecting the UUID of each of these set-top boxes, the UUID of the ad insertion zone can be obtained. At this point, the business unit can conveniently retrieve any authorized information associated with these set-top boxes. By traversing the universal dependency model using the set-top box UUID as a common identifier (in this case), additional business, technical or operational information can be associated with the advertising insertion zone. The key enabler for such data retrieval is use of a universal alias and universal dependency (so that, in this case, the advertising sales business unit can query for information bound to a subscriber or subscriber device outside the limits of their own direct platform management data.)

Spanning Time

A system for universal alias and universal dependency uses time as a key navigation point. Each record has a Julian time stamp (with millisecond or better granularity), and (importantly), records are not overwritten; they accumulate in storage, and are only archived or discarded by intention. This is called "versioning".

A likely application of time-stamped data records is in management of equipment aging. Aging equipment is a specific area of concern to Charter Field Operations, which has found through analysis that aged equipment is potentially less reliable than new equipment, due to environmental factors that lead to electrical deterioration. By creating a UUID for each physical component in the outside plant network (to a sufficient level of detail), equipment age can be correlated with service availability (by measurement of service outage records attached to the subscribers served by the physical component in question.)

Although time stamped records are traditionally viewed with an eye towards historic data retrieval, records or sets of records can readily be created with future time stamps, or with attributes that render the record(s) as "hypothetical".

A likely application for future records is network planning. For example, one contemporary method of HFC network capacity management is sub-dividing a service area to effectively increase the share of network service equipment made available to a given subscriber. Although this method has future limitations, it is common contemporary practice and is considered here for illustration. Subscribers within a service area make use of a shared HFC node; in this sense, each subscriber UUID has an upline link to a specific node (UUID) serving the subscriber. To plan a node split, at least one new node is introduced into the service area, and wiring changes (either within network devices, or more likely, in certain cable interconnections within the existing node service area) are planned. By creating a future instance of the node service area, a new (but presently inactive) universal alias and dependency structure would be created, reflecting the new design not yet in place. At the point in time where the node split is physically active, the current universal alias and dependency structure (reflecting the original, single-node configuration) would be archived, and the new (split configuration) structure would be made active.

Another likely application for future records is network modeling. Network modeling involves creating "what if" scenarios which are evaluated as an aid towards defining and assessing strategy. In this case, a geographic area (with its attendant unique attributes) could be cloned, creating one or more hypothetical universal alias and dependency structures. To these hypothetical structures, changes would be made reflecting potential scenarios, but benefiting from the physical reality of the network footprint from which they were generated.

As-Built Coherence and the Sequence of Construction

A key observation one may make is related to preserving fidelity in a data structure that is intended to reflect the real world (recall that in this system, "real world" could be actual devices, software service components, or virtual entities intended to create business, operational or technical groupings.) The vision of universal alias and dependency is that it becomes the source of truth. In this case, a change made in the universal alias and dependency structure would be reflective of future or desired state. These future structures differ from current (or as-built) structures, and the differences are themselves the source of work flow. For example, if a set-top box is to be upgraded in a subscriber's home, a future data record reflecting the new set-top box would be created; the difference in current and future configuration within the subscriber's home (recall the "billing address" is a likely virtual UUID), and the action of "remedying" the different is the work task of replacing the set-top box to the point of validated completion.

Geospatial Mapping Systems

Universal alias and universal dependency share some common traits with geospatial mapping systems. In a geospatial mapping system, physical asset location is described, along with physical connectivity (routes and characteristics) between physical asset locations. Geospatial mapping systems have limited utility in terms of defining and managing dependency. Geospatial mapping systems have limited utility in terms of creating virtual structures (for example, a business grouping does not have a physical "head" location per se, a proposition which is difficult to realize in a geospatial mapping system). Geospatial mapping systems have varying facility with the concept of versioning, which was discussed in this paper under the term "spanning time."

Note again that techniques herein are well suited to create one or more network models to analyze a network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving data associated with a set of elements in a network;
   assigning a unique identifier value to each respective element in the set;
   receiving attribute information indicating different attributes pertinent to the set of elements; and
   for each unique identifier value of multiple identifier values, via the received data, producing a corresponding set of encoded information indicating settings for the attributes indicated by the attribute information; the method further comprising:
   combining the produced corresponding set of encoded information for each of the unique identifier values into an analytics data set defining the network in which the set of network elements reside; and
   in response to receiving a command, deriving a network model from the analytics data set defining the network.

2. The method as in claim 1 further comprising:
   receiving supplemental cost data with respect to the analytics data set; and
   applying the supplemental cost data to the analytics data set to produce a cost model.

3. The method as in claim 1, wherein the attributes include a first attribute and a second attribute, the first attribute pertaining to geographical location, the second attribute pertaining to connectivity, the method further comprising:
   producing a first set of encoded information for a first network element assigned a first unique identifier value, the first attribute for the first set of encoded information indicating a first geographical location in which the first network element resides, the second attribute for the first set of encoded information indicating connectivity of the first network element to a root network element; and
   producing a second set of encoded information for a second network element assigned a second unique identifier value, the first attribute for the second set of encoded information indicating a second geographical location in which the second network element resides, the second attribute for the second set of encoded information indicating connectivity of the second network element to the first network element.

4. A method comprising:
   receiving data associated with a set of elements in a network;
   assigning a unique identifier value to each respective element in the set;
   receiving attribute information indicating different attributes pertinent to the set of elements; and
   for each unique identifier value of multiple identifier values, via the received data, producing a corresponding set of encoded information indicating settings for the attributes indicated by the attribute information; and wherein the network elements are network segments, the corresponding set of encoded information indicating connectivity of the network segments with respect to each other.

5. A method comprising:

receiving data associated with a set of elements in a network;

assigning a unique identifier value to each respective element in the set;

receiving attribute information indicating different attributes pertinent to the set of elements; and for each unique identifier value of multiple identifier values, via the received data, producing a corresponding set of encoded information indicating settings for the attributes indicated by the attribute information;

wherein the attribute information indicates attributes associated with a specific type of network in which the set of network elements reside; and wherein the specific type of network is one of:
 i) an optical network,
 ii) a hybrid fiber coaxial network, and
 iii) a coaxial cable network.

6. A method comprising:

receiving data associated with a set of elements in a network;

assigning a unique identifier value to each respective element in the set;

receiving attribute information indicating different attributes pertinent to the set of elements;

for each unique identifier value of multiple identifier values, via the received data, producing a corresponding set of encoded information indicating settings for the attributes indicated by the attribute information;

wherein the network elements include at least a first network element and a second network element, the first network element assigned a first unique identifier value, the second network element assigned a second unique identifier value;

wherein, via the received data, producing the corresponding set of encoded information indicating settings for the attributes in the attribute information includes:
 i) producing a first corresponding set of encoded information for the first unique identifier value, the first corresponding set of encoded information indicating connectivity of the first network element to a root network element in the network; and
 ii) producing a second corresponding set of encoded information for the second unique identifier value, the second corresponding set of encoded information indicating connectivity of the second network element to the first network element in the network.

7. A method comprising:

receiving data associated with a set of elements in a network;

assigning a unique identifier value to each respective element in the set;

receiving attribute information indicating different attributes pertinent to the set of elements; and for each unique identifier value of multiple identifier values, via the received data, producing a corresponding set of encoded information indicating settings for the attributes indicated by the attribute information, the method further comprising:

producing each of the corresponding sets of encoded information to include a coefficient matrix; and utilizing the coefficient matrix to produce settings for a model derived from the network.

8. A method comprising:

receiving data associated with a set of elements in a network;

assigning a unique identifier value to each respective element in the set;

receiving attribute information indicating different attributes pertinent to the set of elements; and for each unique identifier value of multiple identifier values, via the received data, producing a corresponding set of encoded information indicating settings for the attributes indicated by the attribute information, the method further comprising:

utilizing the corresponding set of encoded information to produce a model to perform a simulation of data traffic transmitted over the network.

9. A computer system comprising:

a repository to store data associated with a set of elements in a network;

computer processor hardware operable to:
 retrieve the data;
 assign a unique identifier value to each respective element in the set;
 receive attribute information indicating different attributes pertinent to the set of elements; and
 for each unique identifier value, utilize the received data to produce a corresponding set of encoded information indicating settings for the different attributes in the attribute information;
 combine the produced corresponding set of encoded information for each of the unique identifier values into an analytics data set defining the network in which the set of network elements reside.

10. The computer system as in claim 9, wherein the computer processor hardware is further operable to:

in response to receiving a command, derive a network model from the analytics data set defining the network.

11. A computer system comprising:

a repository to store data associated with a set of elements in a network;

computer processor hardware operable to:
 retrieve the data;
 assign a unique identifier value to each respective element in the set;
 receive attribute information indicating different attributes pertinent to the set of elements; and
 for each unique identifier value, utilize the received data to produce a corresponding set of encoded information indicating settings for the different attributes in the attribute information;

wherein the computer processor hardware is further operable to:
 produce the corresponding set of encoded information for each unique identifier value to include a setting for each of the different attributes in the attribute information.

12. A computer system comprising:

a repository to store data associated with a set of elements in a network;

computer processor hardware operable to:
 retrieve the data;
 assign a unique identifier value to each respective element in the set;
 receive attribute information indicating different attributes pertinent to the set of elements; and
 for each unique identifier value, utilize the received data to produce a corresponding set of encoded information indicating settings for the different attributes in the attribute information;

wherein the network elements are network segments, the corresponding set of encoded information indicating connectivity of the network segments with respect to each other.

13. A computer system comprising:
a repository to store data associated with a set of elements in a network;
computer processor hardware operable to:
  retrieve the data;
  assign a unique identifier value to each respective element in the set:
  receive attribute information indicating different attributes pertinent to the set of elements; and
  for each unique identifier value, utilize the received data to produce a corresponding set of encoded information indicating settings for the different attributes in the attribute information;
wherein the attribute information indicates attributes associated with a specific type of network in which the set of network elements reside.

14. A computer system comprising:
a repository to store data associated with a set of elements in a network;
computer processor hardware operable to:
  retrieve the data;
  assign a unique identifier value to each respective element in the set;
  receive attribute information indicating different attributes pertinent to the set of elements; and
  for each unique identifier value, utilize the received data to produce a corresponding set of encoded information indicating settings for the different attributes in the attribute information;
wherein the network elements include at least a first network element and a second network element, the first network element assigned a first unique identifier value, the second network element assigned a second unique identifier value.

15. The computer system as in claim 14, wherein the computer processor hardware is further operable to:
produce a first corresponding set of encoded information for the first unique identifier value, the first corresponding set of encoded information indicating connectivity of the first network element to a third network element in the network; and
produce a second corresponding set of encoded information for the second unique identifier value, the second corresponding set of encoded information indicating connectivity of the second network element to the first network element in the network.

16. A computer system comprising:
a repository to store data associated with a set of elements in a network;
computer processor hardware operable to:
  retrieve the data;
  assign a unique identifier value to each respective element in the set;
  receive attribute information indicating different attributes pertinent to the set of elements; and
  for each unique identifier value, utilize the received data to produce a corresponding set of encoded information indicating settings for the different attributes in the attribute information;
wherein the attributes include a first attribute and a second attribute, the first attribute pertaining to geographical location, the second attribute pertaining to connectivity; and
wherein the computer processor hardware is further operable to:
  produce a first set of encoded information for a first network element assigned a first unique identifier value, the first attribute for the first set of encoded information indicating a first geographical location in which the first network element resides, the second attribute for the first set of encoded information indicating connectivity of the first network element to a third network element; and
  produce a second set of encoded information for a second network element assigned a second unique identifier value, the first attribute for the second set of encoded information indicating a second geographical location in which the second network element resides, the second attribute for the second set of encoded information indicating connectivity of the second network element to the first network element.

17. A computer system comprising:
a repository to store data associated with a set of elements in a network;
computer processor hardware operable to:
  retrieve the data;
  assign a unique identifier value to each respective element in the set;
  receive attribute information indicating different attributes pertinent to the set of elements; and
  for each unique identifier value, utilize the received data to produce a corresponding set of encoded information indicating settings for the different attributes in the attribute information;
wherein the computer processor hardware is further operable to:
  produce each of the corresponding sets of encoded information to include a coefficient matrix; and
  utilize the coefficient matrix to produce settings for a model derived from the network.

18. A computer system comprising:
a repository to store data associated with a set of elements in a network;
computer processor hardware operable to:
  retrieve the data;
  assign a unique identifier value to each respective element in the set;
  receive attribute information indicating different attributes pertinent to the set of elements; and
  for each unique identifier value, utilize the received data to produce a corresponding set of encoded information indicating settings for the different attributes in the attribute information;
wherein the computer processor hardware is further operable to:
  utilize the corresponding set of encoded information to produce a model to simulate a flow of data over the network.

19. Computer-readable storage hardware having instructions stored thereon, the instructions, when executed by computer processor hardware, cause the computer processor hardware to:
receive data associated with a set of elements in a network;

assign a unique identifier value to each respective element in the set;

receive attribute information indicating different attributes pertinent to the set of elements; and for each unique identifier value, utilize the received data to produce a corresponding set of encoded information indicating settings for the attributes in the attribute information;

combine the produced corresponding set of encoded information for each of the unique identifier values into an analytics data set defining the network in which the set of network elements reside; and in response to receiving a command, derive a network model from the analytics data set defining the network.

20. A method comprising:

receiving data associated with a set of elements in a network;

assigning a unique identifier value to each respective element in the set;

receiving attribute information indicating different attributes pertinent to the set of elements; and for each unique identifier value of multiple identifier values, via the received data, producing a corresponding set of encoded information indicating settings for the attributes indicated by the attribute information;

wherein the network elements include at least a first network element and a second network element, the first network element assigned a first unique identifier value, the second network element assigned a second unique identifier value; and wherein producing the corresponding set of encoded information includes: i) producing a first corresponding set of encoded information for the first unique identifier value, the first corresponding set of encoded information indicating connectivity of the first network element to a third network element in the network, and ii) producing a second corresponding set of encoded information for the second unique identifier value, the second corresponding set of encoded information indicating connectivity of the second network element to the first network element in the network.

21. A method comprising:

receiving data associated with a set of elements in a network;

assigning a unique identifier value to each respective element in the set;

receiving attribute information indicating different attributes pertinent to the set of elements; and for each unique identifier value of multiple identifier values, via the received data, producing a corresponding set of encoded information indicating settings for the attributes indicated by the attribute information;

wherein the attributes include a first attribute and a second attribute, the first attribute pertaining to geographical location, the second attribute pertaining to connectivity, the method further comprising:

producing a first set of encoded information for a first network element assigned a first unique identifier value, the first attribute for the first set of encoded information indicating a first geographical location in which the first network element resides, the second attribute for the first set of encoded information indicating connectivity of the first network element to a third network element; and producing a second set of encoded information for a second network element assigned a second unique identifier value, the first attribute for the second set of encoded information indicating a second geographical location in which the second network element resides, the second attribute for the second set of encoded information indicating connectivity of the second network element to the first network element.

22. A method comprising:

receiving data associated with a set of elements in a network;

assigning a unique identifier value to each respective element in the set:

receiving attribute information indicating different attributes pertinent to the set of elements; and for each unique identifier value of multiple identifier values, via the received data, producing a corresponding set of encoded information indicating settings for the attributes indicated by the attribute information;

wherein the set of elements includes a first network element and a second network element;

wherein the multiple identifier values include a first identifier value and a second identifier value, the first identifier value assigned to the first network element, the second identifier value assigned to the second network element, the method further comprising:

i) producing first settings for each of the attributes in the attribute information, the first settings indicating attributes associated with the first network element, and ii) producing second settings for each of the attributes in the attribute information, the second settings indicating attributes of the second network element.

23. The method as in claim 22, wherein the first settings indicate a first upstream network element to which the first network element is connected; and wherein the second settings indicate that the second network element is connected to the first network element.

24. A method comprising:

receiving data associated with a set of elements in a network;

assigning a unique identifier value to each respective element in the set;

receiving attribute information indicating different attributes pertinent to the set of elements;

for each unique identifier value of multiple identifier values, via the received data, producing a corresponding set of encoded information indicating settings for the attributes indicated by the attribute information; and wherein producing the corresponding set of encoded information for each of the multiple unique identifier values includes:

producing a first set of encoded information associated with a first network element in the network; and producing a second set of encoded information associated with a second network element the network, the second set of encoded information indicating connectivity of the second network element with the first network element.

25. The method as in claim 24, wherein producing the corresponding set of encoded information for each of the multiple unique identifier values includes:

producing a third set of encoded information associated with a third network element in the network, the second set of encoded information indicating connectivity of the third network element with respect to the second network element.

26. The method as in claim 25, wherein the first set of encoded information indicates a first geographical location in which the first network element resides in the network;
- wherein the second set of encoded information indicates a second geographical location in which the second network element resides in the network; and
- wherein the third set of encoded information indicates a third geographical location in which the third network element resides in the network.

27. The method as in claim 25, wherein the second set of encoded information indicates attributes of a first communication link between the second network element and the first network element; and
- wherein the third set of encoded information indicates attributes of a second communication link between the third network element and the second network element.

28. A method comprising:
- receiving data associated with a set of elements in a network;
- assigning a unique identifier value to each respective element in the set;
- receiving attribute information indicating different attributes pertinent to the set of elements;
- for each unique identifier value of multiple identifier values, via the received data, producing a corresponding set of encoded information indicating settings for the attributes indicated by the attribute information;
- wherein producing the corresponding set of encoded information for each of the multiple unique identifier values includes: i) producing a first set of encoded information associated with a first network element in the network, and ii) producing a second set of encoded information associated with a second network element the network;
- wherein the first set of encoded information includes first installation cost information associated with the first network element; and
- wherein the second set of encoded information includes second installation cost information associated with the second network element.

29. The method as in claim 28, wherein the first set of encoded information and the second set of encoded information are encoded in accordance with a connectivity hierarchy.

\* \* \* \* \*

UNITED STATES PATENT AND TRADEMARK OFFICE
CERTIFICATE OF CORRECTION

| | | |
|---|---|---|
| PATENT NO. | : 10,693,737 B1 | Page 1 of 1 |
| APPLICATION NO. | : 15/721250 | |
| DATED | : June 23, 2020 | |
| INVENTOR(S) | : Teflian et al. | |

It is certified that error appears in the above-identified patent and that said Letters Patent is hereby corrected as shown below:

In the Claims

Column 27, Line 13, after the word set, delete ":" and insert --;--

Signed and Sealed this
Eighteenth Day of August, 2020

Andrei Iancu
*Director of the United States Patent and Trademark Office*